United States Patent
Kamon et al.

(10) Patent No.: US 9,602,170 B2
(45) Date of Patent: Mar. 21, 2017

(54) ELECTRICAL INSTRUMENT

(71) Applicant: Panasonic Corporation, Kadoma-shi, Osaka (JP)

(72) Inventors: Kenichi Kamon, Shiga (JP); Kazunori Kurimoto, Hyogo (JP); Yasuo Yoshimura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/387,761

(22) PCT Filed: Mar. 4, 2013

(86) PCT No.: PCT/JP2013/001335
§ 371 (c)(1),
(2) Date: Sep. 24, 2014

(87) PCT Pub. No.: WO2013/145564
PCT Pub. Date: Oct. 3, 2013

(65) Prior Publication Data
US 2015/0044965 A1 Feb. 12, 2015

(30) Foreign Application Priority Data
Mar. 27, 2012 (JP) ................ 2012-070802

(51) Int. Cl.
H04B 5/00 (2006.01)
F24C 7/08 (2006.01)
(Continued)

(52) U.S. Cl.
CPC ............ *H04B 5/0056* (2013.01); *F24C 7/08* (2013.01); *G06K 7/10297* (2013.01); *D06F 39/005* (2013.01)

(58) Field of Classification Search
CPC .. H04B 5/0025; H04B 5/0031; H04B 5/0056; H04B 5/0081; G06K 7/10
See application file for complete search history.

(56) References Cited

U.S. PATENT DOCUMENTS 7,299,035 B2 * 11/2007 Morota ................ G06F 21/564
455/414.1
8,081,574 B2 * 12/2011 Hayashi ............ H04B 7/18523
370/242
(Continued)

FOREIGN PATENT DOCUMENTS

JP 2003-092787 A 3/2003
JP 2006-326289 A 12/2006
(Continued)

OTHER PUBLICATIONS

International Search Report in corresponding International Application No. PCT/JP2013/001335, dated Apr. 16, 2013, 1 page.

*Primary Examiner* — Andrew Wendell
(74) *Attorney, Agent, or Firm* — Brinks Gilson & Lione

(57) ABSTRACT

An electrical instrument of the present invention includes: a main function section; a communication section that receives an aspect of a main function to be executed by the main function section from an external information terminal by near field communication; an input section for allowing a user to input an aspect of the main function to be executed by the main function section; a notification section for issuing a notice on information regarding the near field communication; a main function section control unit that controls the main function section based on the aspect of the main function, which is inputted to the input section, and based on the aspect of the main function, which is received by the communication section; a history recording unit that records a near field communication control history that is a history that the main function section control unit has (Continued)

controlled the main function section based on the aspect of the main function, which is received by the communication section; and a notification content decision unit that decides whether or not to issue the notice on the information regarding the near field communication in accordance with whether or not the near field communication control history is recorded in the history recording unit.

6 Claims, 21 Drawing Sheets

(51) Int. Cl.
*G06K 7/10* (2006.01)
*D06F 39/00* (2006.01)

(56) References Cited

U.S. PATENT DOCUMENTS

| | | | | |
|---|---|---|---|---|
| 8,452,487 | B2* | 5/2013 | Yamaguchi | B60C 23/0481 701/33.4 |
| 2007/0042814 | A1* | 2/2007 | Kakimoto | H04W 52/0258 455/574 |
| 2007/0287498 | A1* | 12/2007 | Wang | G06Q 10/087 455/556.1 |
| 2008/0105001 | A1* | 5/2008 | Jeong | D06F 33/02 68/12.02 |
| 2009/0305630 | A1* | 12/2009 | Kuroda | G06Q 10/06 455/41.1 |
| 2011/0087929 | A1* | 4/2011 | Koshiyama | G06F 3/0619 714/48 |
| 2011/0128247 | A1 | 6/2011 | Sensu | |
| 2011/0216329 | A1* | 9/2011 | Uruma | H04N 1/33315 358/1.2 |
| 2012/0164944 | A1* | 6/2012 | Yamaoka | G06K 7/10198 455/41.1 |
| 2012/0246275 | A1* | 9/2012 | Ueda | H04W 28/06 709/217 |
| 2013/0005250 | A1* | 1/2013 | Kim | H04N 21/4126 455/41.1 |
| 2013/0132782 | A1* | 5/2013 | Wiran | G06F 11/0745 714/47.2 |
| 2014/0080460 | A1* | 3/2014 | Maguire | H04M 1/274583 455/414.1 |

FOREIGN PATENT DOCUMENTS

| | | |
|---|---|---|
| JP | 2007-219985 A | 8/2007 |
| JP | 2007-306060 A | 11/2007 |
| JP | 2010-006016 A | 1/2010 |
| JP | 2010-075357 A | 4/2010 |
| JP | 2011-118584 A | 6/2011 |

* cited by examiner

ELECTRICAL INSTRUMENT

This application is a 371 application of PCT/JP2013/001335 having an international filing date of Mar. 4, 2013, which claims priority to JP2012-070802 filed Mar. 27, 2012, the entire contents of which are incorporated herein by reference.

TECHNICAL FIELD

The present invention relates to an electrical instrument that performs near field communication with an information terminal.

BACKGROUND ART

With regard to a conventional electrical instrument, for example, in a case of an electrical instrument attached with a reader/writer, one on which a tag guide function (message notification) is mounted has been proposed, the tag guide function serving for notifying a user of a place near which the user should bring other party (RFID tag) that performs near field communication with the electrical instrument (for example, refer to Patent Literature 1).

FIG. 21 shows the electrical instrument described in Patent Literature 1. A specific electrical instrument in Patent Literature 1 is a rice cooker. Broadly, the rice cooker includes a body 2 and a lid 3. Then, the body 2 includes an operation panel 5, and the operation panel 5 has: a rice cooking key 5a and an OFF key 5b, which serve as input units; and a liquid crystal panel 5c as a notification section.

In a case of cocking rice in a usual way, a user of the rice cooker opens the lid 3, sets rice and water in a rice cooker pot (not shown) built in the rice cooker, and presses the rice cooking key 5a, whereby such rice cooking is executed. Moreover, this rice cooker includes a tag reader (not shown) in an inside thereof, and has a function to change a way of cooking rice based on information of rice, which is acquired from an IC tag attached to a rice bag. A tag guide 6 provided on the rice cooker is configured to notify the user of the place near which the user should bring the tag.

CITATION LIST

Patent Literature

PTL 1: Unexamined Japanese Patent Publication No. 2006-326289

SUMMARY OF INVENTION

Technical Problem

Incidentally, as a portable external information terminal such as a so-called smart phone, which has a near field communication function such as RFID (Radio Frequency IDentification) or NFC (Near Field Communication) and is capable of installing an external application therein, has been widespread in recent years, it is considered to use the external information terminal as described above in place of the above-described tag reader of the rice cooker. However, no matter whether or not the user may use the function to change the way of cooking rice by using the above-described external information terminal, the above-described conventional rice cooker notifies the user of the function concerned, and accordingly, for example, for a user who does not hold the external information terminal, such a notice on the function has been unnecessary. Moreover, such an unnecessary notice has sometimes bothered the user.

The present invention has been made in order to solve the above-described conventional problem. It is an object of the present invention to provide an electrical instrument, which is usable by being given, by using an external information terminal, an aspect of a main function to be executed by a main function section, and is capable of preventing the user from being bothered by the unnecessary notice. Here, the user does not use the electrical instrument, while giving, by using the external information terminal, the electrical instrument the aspect of the main function to be executed by the main function section.

Solution to Problem

In order to solve the above-described conventional problem, an electrical instrument according to a certain aspect of the present invention includes: a main function section that executes a main function of the electrical instrument; a communication section that receives an aspect of the main function to be executed by the main function section from an external information terminal by near field communication; an input section for allowing a user to input an aspect of the main function to be executed by the main function section; a notification section for issuing a notice on information regarding the near field communication; a main function section control unit that controls the main function section based on the aspect of the main function, which is inputted to the input section, or based on the aspect of the main function, which is received by the communication section; a history recording unit that records a near field communication control history that is a history that the main function section control unit has controlled the main function section based on the aspect of the main function, which is received by the communication section; and a notification content decision unit that decides whether or not to issue the notice on the information regarding the near field communication in accordance with whether or not the near field communication control history is recorded in the history recording unit.

Advantageous Effects of Invention

In the electrical instrument, which is usable by being given, by using the external information terminal, the aspect of the main function to be executed by the main function section, the present invention can prevent the user from being bothered by the unnecessary notice. Here, the user does not use the electrical instrument while giving, by using the external information terminal, the electrical instrument the aspect of the main function to be executed by the main function section.

DETAILED DESCRIPTION OF THE PREFERRED EMBODIMENTS

Figure 1:
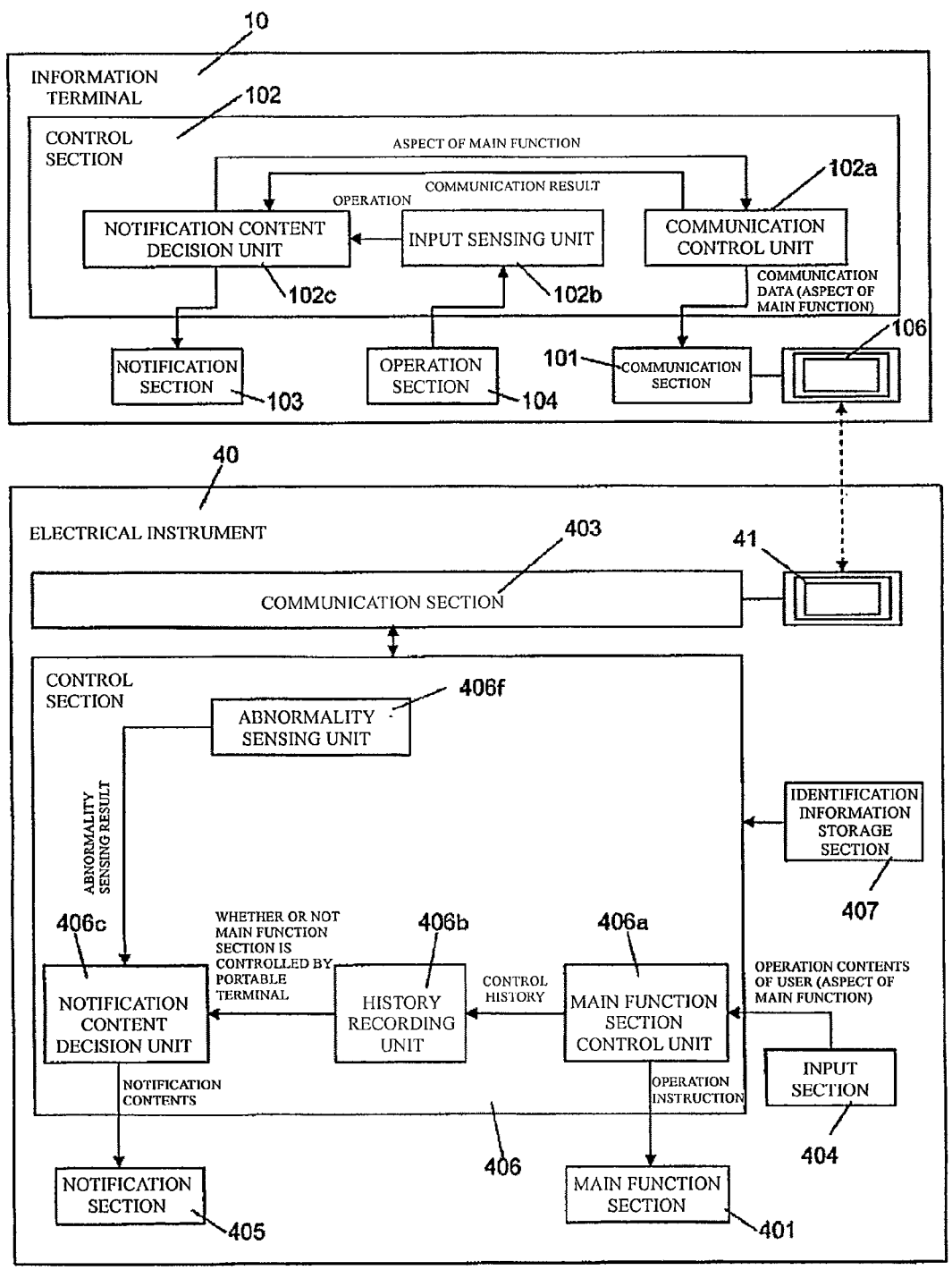
FIG. 1 is a function block diagram showing a configuration example of a system in which an electrical instrument in Embodiment 1 of the present invention is included.

An electrical instrument according to a first invention includes: a main function section that executes a main function of the electrical instrument; a communication section that receives an aspect of the main function to be executed by the main function section from an external information terminal by near field communication; an input section for allowing a user to input an aspect of the main function to be executed by the main function section; a notification section for issuing a notice on information regarding the near field communication; a main function section control unit that controls the main function section based on the aspect of the main function, which is inputted to the input section, or based on the aspect of the main function, which is received by the communication section; a history recording unit that records a near field communication control history that is a history that the main function section control unit has controlled the main function section based on the aspect of the main function, which is received by the communication section; and a notification content decision unit that decides whether or not to issue the notice on the information regarding the near field communication in accordance with whether or not the near field communication control history is recorded in the history recording unit.

In accordance with this configuration, the notification content decision unit can determine whether or not the user uses the electrical instrument while giving the electrical instrument the aspect of the main function, which is to be executed by the main function section, by using the external information terminal based on whether or not the near filed communication control history is recorded in the history recording unit. Then, the notification content decision unit decides whether or not to issue the notice on the information regarding the near field communication in accordance with whether or not the near field communication control history is recorded in the history recording unit. Accordingly, with regard to such a user who does not use the electrical instrument while giving the electrical instrument the aspect of the main function, which is to be executed by the main function section, by using the external information terminal, such an unnecessary notice for the user can be prevented from being issued thereto, and eventually, the user can be prevented from being bothered by the unnecessary notice.

In the electrical instrument of the first invention, an electrical instrument according to a second invention may be configured in that the notification content decision unit is configured to decide to issue the notice on the information regarding the near field communication in the case where the near field communication control history is recorded in the history recording unit, and to decide not to issue the notice on the information regarding the near field communication in the case where the near field communication control history is not recorded in the history recording unit.

In this way, with regard to the user who does not use the electrical instrument while giving the electrical instrument the aspect of the main function, which is to be executed by the main function section, by using the external information terminal, the unnecessary notice for the user can be suitably prevented from being issued thereto, and in addition, with regard to such a user who uses the electrical instrument while giving the electrical instrument the aspect of the main function, which is to be executed by the main function section, by using the external information terminal, the notice on the information regarding the near field communication, which is necessary for the user, can be issued.

In the electrical instrument of the second invention, an electrical instrument according to a third invention further includes: an abnormality sensing unit that senses abnormality of the communication section, configured in that the notification content decision unit may be configured to decide to issue a notice on abnormality of the communication section as the information regarding the near field communication in the case where the near field communication control history is recorded in the history recording unit and the abnormality sensing unit senses the abnormality.

In this way, the user who does not use the electrical instrument by using the near field communication can be prevented from being notified of the abnormality regarding the communication section, which is unnecessary for the user, and the user who uses the electrical instrument by using the near field communication can be notified of the abnormality regarding the communication section, which is necessary for the user.

An electric instrument according to a fourth invention may be configured in that the history recording unit is further configured to record an input control history that is a history that the main function section control unit has controlled the main function section based on the aspect of the main function, which is inputted to the input section, the electrical instrument further includes; a history analysis unit that, based on the near field communication control history and the input control history, which are recorded in the history recording unit, analyzes a relative frequency (hereinafter, referred to as a near field communication control relative frequency) of a fact that the main function section control unit has controlled the main function section based on the aspect of the main function, which is received by the communication section, to a fact that the main function section control unit has controlled the main function section based on the aspect of the main function, which is inputted to the input section, and the notification content decision unit is configured to decide to issue a notice on information that prompts implementation of the communication between the electrical instrument and the information terminal as the information regarding the near field communication in the case where the near field communication control history is recorded in the history recording unit and the near field communication control relative frequency is lower than a predetermined value.

In this way, while the electrical instrument is used by using the near field communication function between the external information terminal and the electrical instrument, a user who less frequently uses the function can be prompted to implement the communication between the external information terminal and the electrical instrument.

A fifth invention may be configured in that the electrical instrument is a home electrical instrument, the electrical instrument further includes: an operation sensing section that senses an operation result of the main function section; and a working condition analysis unit that determines whether or not the home electrical instrument is used in a user's life based on the operation result sensed by the operation sensing section, and the history recording unit starts to record the near field communication control history in the case where the working condition analysis unit determines that the home electrical instrument is used in the user's life.

In this way, use of the electrical instrument in the user's life and use of the electrical instrument in other scene can be distinguished from each other. Therefore, the unnecessary notice can be more accurately prevented from being issued to the user who does not use the electrical instrument while giving the electrical instrument the aspect of the main function, which is to be executed by the main function section, by using the external information terminal.

A sixth invention may be configured in that the electrical instrument is a home heating cooking device, the main function section at least includes a heating chamber and a heating section that heats food housed in the heating chamber, the operation sensing section is a temperature sensing section that senses a temperature of the heating chamber, and the working condition analysis unit determines that the heating cooking device is used in the user's life in the case where the main function section control unit performs control to operate the heating section and the temperature sensing section senses a change of a temperature of the heating chamber.

In this way, use of the home heating cooking device in the user's life and use of the home heating cooking device in other scene can be accurately distinguished from each other.

A seventh invention may be configured in that the electrical instrument is a home washing and drying machine, the main function section includes a washing machine tub, a motor that rotates the washing machine tub, and a feed valve that feeds the washing machine tube with water by open and close of the feed valve itself, the operation sensing section is a water sensing section that senses whether or not water is present in the washing machine tub, and the working condition analysis unit determines that the washing and drying machine is used in the user's life in the case where the main operation control unit performs control to rotate the motor after the main operation control unit performs control to open the feed valve and the water sensing section senses that water is present in the washing machine tub.

In this way, use of the washing and drying machine in the user's life and use of the washing and drying machine in other scene can be accurately distinguished from each other.

A description is made below of embodiments of the present invention while referring to the drawings. Note that the present invention is not limited to the embodiments. Moreover, in the following, the same reference numerals are assigned to the same or corresponding elements throughout all of the drawings, and a duplicate description thereof is omitted.

Embodiment 1

FIG. 1 is a function block diagram showing a configuration example of a system in which an electrical instrument 40 in Embodiment 1 of the present invention is included. This system includes: an information terminal (external information terminal) 10; and the electrical instrument 40.

The information terminal (external information terminal) 10 includes, for example, a communication device such as a cellular phone. Then, the information terminal 10 communicates with the electrical instrument 40 through a loop antenna 106 by using near field communication, and in addition, is communicably connected to a server (not shown) through a network. The near field communication is not particularly limited. As the near field communication, for example, wireless communication between RFID (Radio Frequency IDentification) or NFC (Near Field Communication) and a reader/writer is exemplified. The electrical instrument may be any instrument as long as being provided with a near field communication function; however, a portable instrument is more preferable.

The electrical instrument 40 is an electrical instrument that is communicable with the information terminal 10 through a loop antenna 41 by the RFID or the NFC. As the electrical instrument 40, for example, there are mentioned a microwave oven, a rice cooker, a television set, and an air conditioner. Note that, in the present embodiment, the electrical instrument 40 is not limited to a home electrical instrument.

[Configuration Example of Information Terminal]

The information terminal 10 includes: a communication section 101; a control section 102; a notification section 103; an operation section 104; and the loop antenna 106.

The communication section 101 is a processing section that performs transmission of communication data to the electrical instrument 40 and reception of information transmitted from the electrical instrument 40. In the present embodiment, the communication section 101 performs transmission of information, which includes an aspect of a main function to be executed by a main function section 401 (details will be described later) of the electrical instrument, and reception of electrical instrument identification information. However, the communication section 101 is not limited to this. The above-described aspect of the main function refers to an aspect in which the electrical instrument 40 exerts a function as a main object thereof. If a case where the electrical instrument 40 is a microwave oven is taken as an example, then an aspect of a main function of this microwave oven refers to, for example, an aspect in which an inside of an oven cabinet (heating chamber) is irradiated for five minutes with a microwave with an output of 600 W.

The loop antenna 106 is an antenna for performing the near field communication. In the present embodiment, as a function of the near field communication, RFID or NFC in a high frequency range using, for example, 13.56 MHz band is assumed; however, the near field communication function is not limited to this frequency band. The frequency band of the near field communication may be the UHF band of 90 MHz to 1 GHz, or may be a frequency band exceeding 2 GHz.

Incidentally, with regard to the near field communication, a communication distance thereof is short, and it is necessary to bring such loop antennas of two wireless communication instruments, which communicate with each other, close to each other. Moreover, the RFID built in the cellular phone cannot increase an output of the loop antenna of the cellular phone, and accordingly, positional alignment with the corresponding loop antenna for example, by a unit of a few millimeters is necessary, and it is necessary to accurately bring the loop antenna close to the corresponding loop antenna. Hence, marks which indicate positions of the loop antennas are put onto outer surfaces of portions in which the loop antennas are arranged, the portions belonging to the wireless communication instruments such as the information terminal 10 and the electrical instrument 40. Then, a user brings the marks, which indicate the positions of the loop antennas of the information terminal 10 and the electrical instrument 40, close to each other, and thereby causes the communication between the information terminal 10 and the electrical instrument 40.

Note that, in the present embodiment, the communication section 101 communicates with the electrical instrument 40 by using the near field communication; however, the present invention is not limited to this. In place of this, other wireless communication than the near field communication, the other wireless communication using a radio wave, light or the like, may be used.

The operation section 104 includes, for example, a touch panel or operation keys, and receives an input operation by the user, the input operation including the aspect of the main function to be executed by the main function section 401 of the electrical instrument 40. In the present embodiment, the touch panel is assumed.

The notification section 103 includes a liquid crystal display or the like, and notifies the user of information by displaying a screen, which includes an image, text and the like, to the user.

The control section 102 includes: a communication control unit 102*a*; an input sensing unit 102*b*; and a notification content decision unit 102*c*. The control section 102 includes, for example, a controller having an arithmetic operation portion and a storage portion, and the communication control unit 102*a*, the input sensing unit 102*b* and the notification content decision unit 102*c* are individually function blocks realized in such a manner that the arithmetic operation portion executes predetermined programs stored in the storage portion. The control section 102 includes a microcontroller, a CPU, an MPU, a logic circuit, a PLC (Programmable Logic Controller) or the like. The arithmetic operation portion includes such a processor, and the storage portion includes a memory (a ROM, a RAM or the like) for the processor. In the storage portion, there is stored an application for inputting the aspect of the main function to the electrical instrument 40 of which details will be described later. Preferably, the information terminal 10 is configured so that the user can install therein this application through the Internet. However, without being limited to this, the application may be stored in the storage portion in advance at the time of manufacturing the information terminal 10.

The communication control unit 102*a* is a processing unit, which creates communication data transmitted by the communication section 101, and in addition, analyzes contents of communication data received by the communication section 101. In the present embodiment, the communication control unit 102*a* is a processing unit, which creates communication data according to the aspect of the main function, the communication data being transmitted to the electrical instrument 40, based on the contents inputted by the user to such an input screen.

The input sensing unit 102*b* is a processing unit, which senses an operation of the user to the operation section 104, and transfers this to the notification content decision unit 102*c*.

The notification content decision unit 102*c* is a processing unit, which decides contents of which notice is issued to the user. Based on contents of the operation of the user to the operation section 104, the contents being transferred from the input sensing unit 102*b*, the notification content decision unit 102*c* decides next display contents, and performs processing including processing for controlling the notification section 103 to notify the next display contents. Moreover, based on the contents of the operation of the user to the operation section 104, the contents being transferred from the input sensing unit 102*b*, the notification content decision unit 102*c* transfers the aspect of the main function to the communication control unit 102*a*.

[Configuration Example of Electrical Instrument]

The electrical instrument 40 includes: a main function section 401; a communication section 403; an input section 404; a notification section 405; a control section 406; and an identification information storage section 407.

The main function section 401 executes the main function of the electrical instrument. That is to say, if the electrical instrument 40 is a rice cooker, then the main function section 401 includes, for example, a rice cooker pot and a heating unit that heats this rice cooker pot.

By the near field communication, the communication section 403 transmits and receives a variety of information to and from the information terminal 10 bidirectionally through the loop antenna 41 for performing the near field communication. The information received by the communication section 403 includes the aspect of the main function sent from the information terminal 10.

The input section 404 receives a user's operation for the electrical instrument 40 including the aspect of the main function, and senses this operation. As the input section 404, a push button switch, a jog dial, a keyboard, or a touch panel is exemplified; however, the input section 404 is not limited to this.

The control section 406 includes: a main function section control unit 406a; a history recording unit 406b; and a notification content decision unit 406c.

The main function section control unit 406a controls the main function section 401 based on the aspect of the main function, which is inputted to the input section 404, and based on the aspect of the main function, which is transmitted from the information terminal 10 and received from the communication section 403.

The history recording unit 406b records information including a history (hereinafter, referred to as a near field communication control history) that the main function section control unit 406a controls the main function section 401 based on the aspect of the main function, which is transmitted from the information terminal 10 and received by the communication section 403. A record including this information configures the control history. In the present embodiment, in the control history, information regarding specific contents of the control for the main function section 401 is included as well as the information indicating that the control of the main function section control unit 406a is performed based on the aspect of the main function, which is received by the communication section 403. However, the information included in the control history is not limited to this. In the control history, there may be included only the information indicating that the control of the main function section control unit 406a is performed based on the aspect of the main function, which is received by the communication section 403.

The notification content decision unit 406c decides user notification information that is information of which notice should be issued to the user. In the present embodiment, the notification content decision unit 406c decides whether or not to notify the user particularly of information regarding the near field communication among the user notification information by the notification section 405.

The notification section 405 is a section for notifying the user of the user notification information decided by the notification content decision unit 406c. The notification section 405 notifies the user particularly of the information regarding the near field communication in accordance with the decision of the notification content decision unit 406c. As the notification section 405, an LED display lamp and a liquid crystal display are exemplified; however, the notification section 405 is not limited to this.

Moreover, in the present embodiment, the control section 406 has an abnormality sensing unit 406f that senses abnormality of the electrical instrument 40 including the communication section 403.

Then, the control section 406 includes, for example, a controller having an arithmetic operation portion and a storage portion, and the main function section control unit 406a, the history recording unit 406b, the notification content decision unit 406c and the abnormality sensing unit 406f are individually function blocks realized in such a manner that the arithmetic operation portion executes predetermined programs stored in the storage portion. The control section 406 includes a microcontroller, a CPU, an MPU, a logic circuit, a PLC (Programmable Logic Controller) or the like. The arithmetic operation portion includes such a processor, and the storage section includes a memory (a ROM, a RAM or the like) for the processor.

The identification information storage section 407 stores the electrical instrument identification information in advance. The electrical instrument identification information is information for identifying the electrical instrument 40, and for example, is a model number and serial number of the electrical instrument 40. Note that, in the present embodiment, the electrical instrument identification information is stored in the identification information storage section 407 in advance at the time of manufacturing the electrical instrument 40; however, the electrical instrument identification information is not limited to this. The identification information storage section 407 includes, for example, a storage such as a memory.

Operation Example

Figure 2:
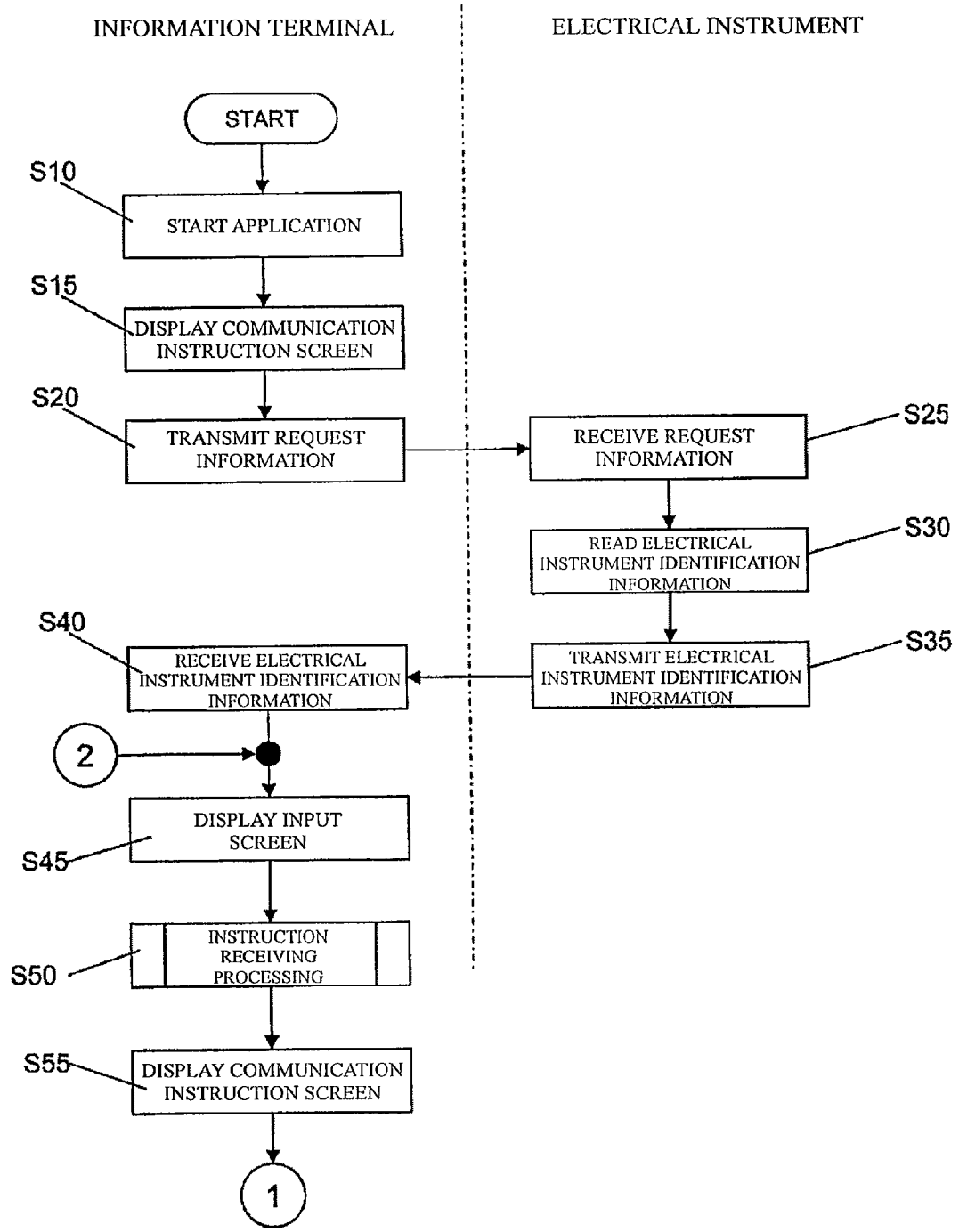
FIG. 2 is a first flowchart showing an operation example of the system in which the electrical instrument in Embodiment 1 of the present invention is included.
Figure 3:
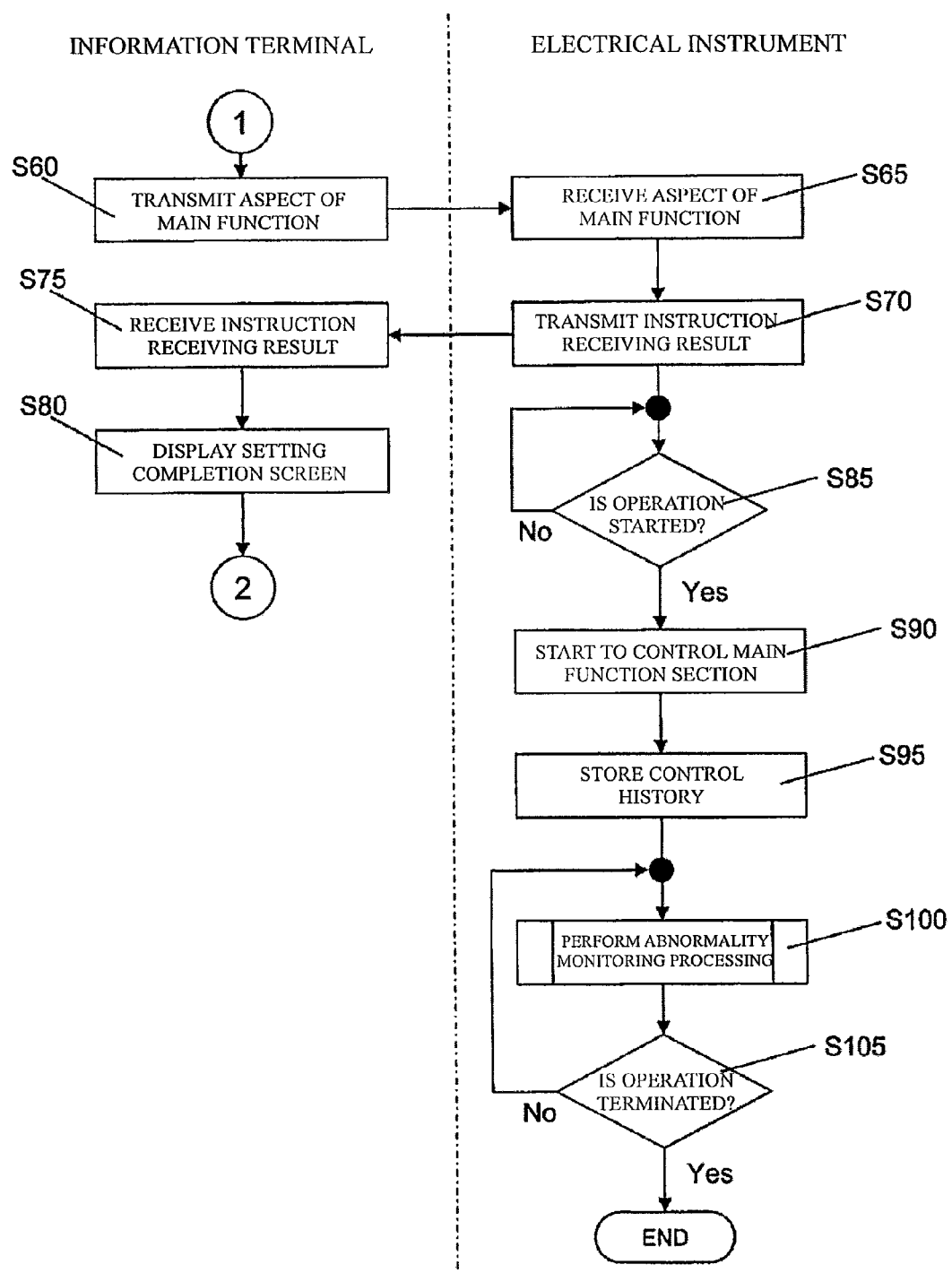
FIG. 3 is a second flow chart showing the operation example of the system in which the electrical instrument in Embodiment 1 of the present invention is included.

Next, a description is made of operations of the electrical instrument 40 in the embodiment of the present invention. FIG. 2 is a first flowchart showing an operation example of the system in which the electrical instrument 40 in the embodiment of the present invention is included. FIG. 3 is a second flowchart showing the operation example of the system in which the electrical instrument 40 in the embodiment of the present invention is included.

First, in Step S10, the control section 102 of the information terminal 10 starts the application for inputting the aspect of the main function to the electrical instrument 40. This application is installed in advance in the information terminal 10 by the user. Then, the start of the application is started in such a manner that a start instruction of the application by the user is transferred to the control section 102 through the operation section 104.

Next, in Step S15, the notification content decision unit 102c controls the notification section 103 to display a communication instruction screen. Then, the notification section 103 displays the communication instruction screen. The communication instruction screen is a screen that guides the user to bring the communication section 101 and the electrical instrument 40 close to each other in order that the communication section 101 and the electrical instrument 40 can communicate with each other. Note that, more specifically, the communication instruction screen is a screen that guides the user to bring the loop antenna 106 of the information terminal 10 and the loop antenna 41 of the electrical instrument 40 close to each other. Moreover, the communication instruction screen is stored in advance in a storage section (not shown) which the information terminal 10 includes, and the notification content decision unit 102c reads out the communication instruction screen from the storage section and displays the communication instruction screen.

Next, in Step S20, the communication control unit 102a controls the communication section 101 to transmit request information for requesting the electrical instrument identification information to the electrical instrument 40. Note that the communication section 101 starts to transmit the request information to the electrical instrument 40 in conjunction with that the communication instruction screen is displayed on the notification section 103.

Next, when the user brings the communication section 101 and the electrical instrument 40 close to each other by a distance at which these are communicable with each other, then in Step S25, the communication section 403 of the electrical instrument 40 receives the request information transmitted by the communication section 101 of the information terminal 10. Note that, in an event where the request information is received, an operation of enabling the electrical instrument 40 to receive the request information is implemented therebefore by the user. In the present embodiment, the operation of enabling the electrical instrument 40 to receive the request information refers to an operation of setting a state where a plug thereof is connected to a commercial power supply and the electrical instrument 40 is turned on.

Next, in Step S30, the control section 406 of the electrical instrument 40 reads out the electrical instrument identification information from the identification information storage section 407.

Then, in Step S35, the control section 406 controls the communication section 403 to transmit the read-out electrical instrument identification information to the information terminal 10. Then, receiving the control of the control section 406, the communication section 403 transmits the electrical instrument identification information to the information terminal 10.

At this time, the control section 406 may transmit information regarding a user's actual status of use of the electrical instrument 40, such as a usage count thereof as well as the electrical instrument identification information. Then, the information terminal 10 transmits the received information concerned to a remotely located server (not shown) managed by a manufacturer of the electrical instrument 40, whereby the manufacturer can analyze the transmitted information to make good use thereof for grasping an actual status of use of the electrical instrument 40 in each family.

Next, in Step S40, the information terminal 10 receives the electrical instrument identification information.

Next, in Step S45, the notification content decision unit 102*c* creates an input screen that corresponds to the electrical instrument 40 identified by the electrical instrument identification information, and performs control to display this input screen on the notification section 103.

Next, in Step S50, the information terminal 10 performs instruction receiving processing for receiving a user's instruction to the electrical instrument 40. As described above, the information terminal 10 acquires the electrical instrument identification information from the electrical instrument 40, and thereby receives the user's instruction to the electrical instrument 40 from the input screen corresponding to each of a variety of electrical instruments different in function. Accordingly, it is unnecessary for the user to perform an operation of selecting an operation target instrument, and the operations are facilitated. Moreover, input of an instruction to an instrument different from the operation target instrument can be prevented.

Then, when the control section 102 receives the user's instruction to the electrical instrument 40, then in Step S55, the notification content decision unit 102*c* controls the notification section 103 to display the communication instruction screen that guides the user to bring the communication section 101 and the electrical instrument 40 close to each other in order to execute the communication between the communication section 101 and the electrical instrument 40. Then, upon receiving the control of the control section 102, the notification section 103 displays the communication instruction screen.

Next, when the user brings the communication section 101 and the electrical instrument 40 close to each other by the distance at which these are communicable with each other, then in Step S60, the communication section 101 of the information terminal 10 transmits the aspect of the main function to the electrical instrument 40.

Next, in Step S65, the communication section 403 of the electrical instrument 40 receives the aspect of the main function, which is transmitted by the communication section 101 of the information terminal 10.

Next, in Step S70, the main function section control unit 406*a* transmits an instruction receiving result information. This instruction receiving result information is information regarding whether or not the main function section control unit 406*a* has received the aspect of the main function normally. As cases of transmitting an instruction receiving result information to the effect that the main function section control unit 406*a* has not been able to receive the aspect of the main function, there are exemplified: a case where abnormality occurs in the electrical instrument 40, and the main function section control unit 406*a* cannot operate the main function section 401; a case where the main function section control unit 406*a* has already operated the main function section 401; and the like.

Next, in Step S75, the communication section 101 of the information terminal 10 receives the instruction receiving result information transmitted by the communication section 403 of the electrical instrument 40. Then, in Step S80, the notification content decision unit 102*c* controls the notification section 103 to display a setting completion screen indicating that the transmitted aspect of the main function is received by the electrical instrument 40. Then, the notification section 103 displays the setting completion screen. Note that the control section 102 may terminate the application in Step S75 without displaying an application terminating instruction receiving screen.

Next, returning to the processing of Step S45, the control section 102 displays the input screen corresponding to the electrical instrument 40.

Note that, in the present embodiment, the termination of the application is performed by using an application terminating instruction function provided by an operating system of the information terminal 10. During activation of the application, this application terminating instruction is configured to be always given to the information terminal 10. However, such termination of the application is not limited to this, and the application may receive the application terminating instruction, and the application may be terminated based on the received terminating instruction.

Meanwhile, after transmitting the instruction receiving result in Step S70, then in Step S85, the control section 406 of the electrical instrument 40 is on standby until receiving a user's operation starting instruction through the input section 404. This operation starting instruction is, for example, a pressing operation of a start button by the user.

Then, upon being given the user's operation starting instruction, then in Step S90, the main function section control unit 406*a* receives the aspect of the main function, and starts the control for the main function section 401 in accordance with contents of the instruction.

Note that the operation starting instruction to the electrical instrument 40 may be included in the above-described aspect of the main function. In this case, the main function section control unit 406*a* does not put itself on standby until receiving the user's operation starting instruction through the input section 404 in Step S85, but the electrical instrument 40 starts the operations in accordance with the aspect of the main function immediately when the aspect of the main function, which is received from the information terminal 10 in Step S65, is received by the electrical instrument 40.

Next, in Step S95, the history recording unit 406*b* records a near field communication control history. Note that, in the present embodiment, the history recording unit 406*b* is configured to record an input control history that is a history that the main function section control unit 406*a* has controlled the main function section 401 based on the aspect of the main function, which is inputted to the input section 404, in the case where the control of the main function section control unit 406*a* is not performed based on the aspect of the main function, which is received by the communication section 403, but the control for the main function section 401 is performed based on the aspect of the main function, which is inputted to the input section 404. However, the history recording unit 406*b* is not limited to this, and may be configured so as not to record the input control history.

Next, in Step S100, the control section 406 executes abnormality monitoring processing. The abnormality monitoring processing is processing for sensing that abnormality occurs in the electrical instrument 40 and notifying the user of such an occurrence of the abnormality.

Figure 4:
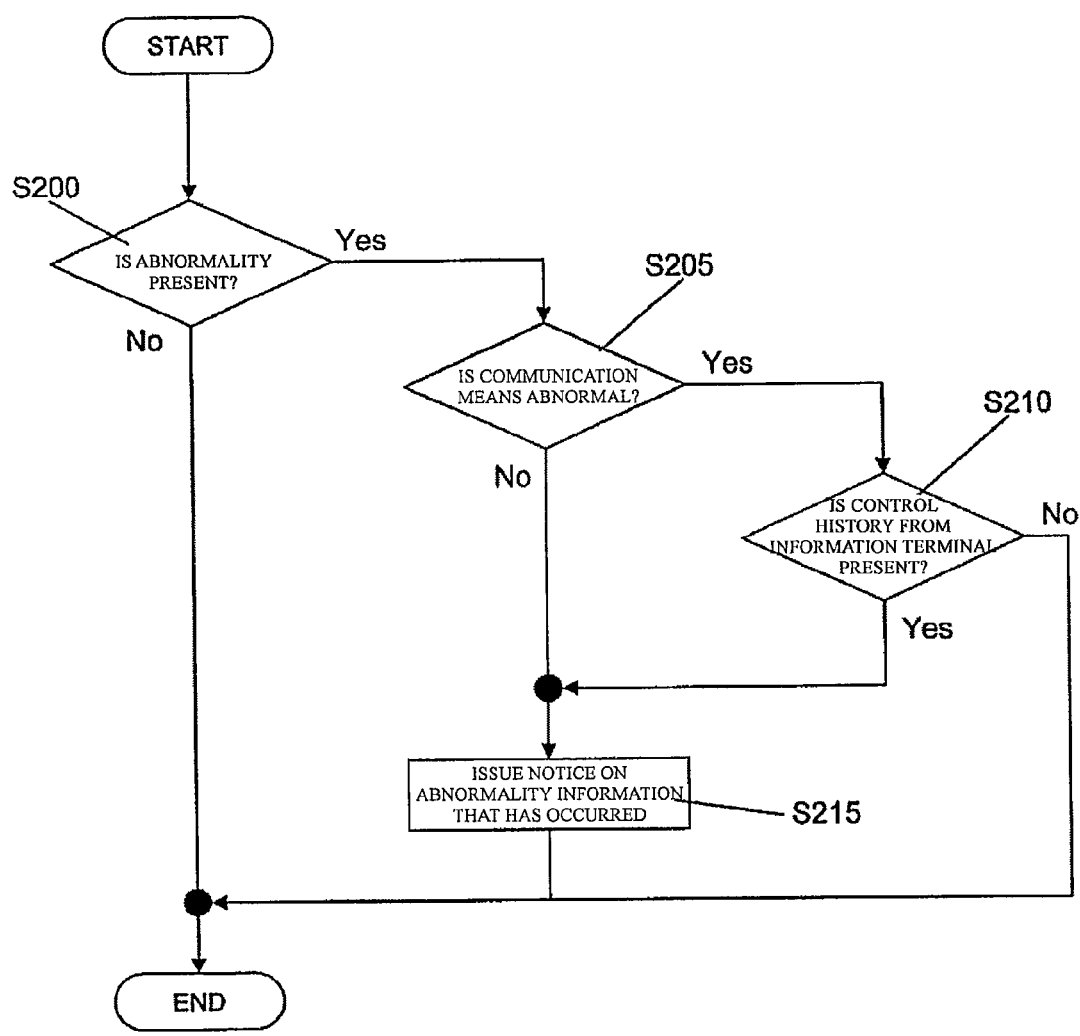
FIG. 4 is a flowchart showing an operation example of abnormality monitoring processing of the system in which the electrical instrument in Embodiment 1 of the present invention is included.

FIG. 4 is a flowchart showing the abnormality monitoring processing.

As shown in FIG. 4, first, in Step S200, the control section 406 determines whether or not the abnormality occurs in the electrical instrument 40.

Next, in the case where the abnormality does not occur (No in Step S200), the control section 406 terminates the abnormality monitoring processing.

Meanwhile, in the case where the abnormality sensing unit 406*f* senses that the abnormality occurs in the electrical instrument 40 (Yes in Step S200), the notification content decision unit 406*c* determines whether or not the abnormality that occurs is abnormality generated in the communication section 403 (Step S205).

Then, in the case where the abnormality sensing unit 406*f* determines that the abnormality that occurs is not the abnormality of the communication section 403 (No in Step S205), then the notification content decision unit 406*c* decides a screen, which issues a notice that the abnormality occurs, as the user notification information, and controls the notification section 405 to display this (Step 215). In this way, the user can get to know the abnormality of other than the communication section 403 through the notification section 405. Then, the control section 406 terminates the abnormality monitoring processing.

Meanwhile, in the case where the abnormality that occurs is the abnormality of the communication section 403 (Yes in Step S205), then the notification content decision unit 406*c* analyzes the control history recorded in the history recording unit 406*b*, and determines whether or not the near field communication control history is recorded in the history recording unit 406*b* (Step S210).

Then, in the case where the notification content decision unit 406*c* determines that the near field communication control history is recorded in the history recording unit 406*b* (Yes in Step S210), then the notification content decision unit 406*c* decides a screen, which issues a notice that abnormality regarding the near field communication occurs, as the user notification information, and controls the notification section 405 to display this user notification information (Step S215). In this way, the user can get to know the abnormality of the communication section 403 through the notification section 405. Then, the control section 406 terminates the abnormality monitoring processing.

Meanwhile, in the case where the notification content decision unit 406*c* determines that the near field communication control history is not recorded in the history recording unit 406*b* (No in Step S210), then the notification content decision unit 406*c* decides not to issue the notice on this abnormality regarding the near field communication, and the notification section 405 does not issue the notice on this abnormality. Note that the user notification information may be displayed on the notification section 405 at arbitrary timing. Then, the control section 406 terminates the abnormality monitoring processing.

Then, when the abnormality monitoring processing of Step S385 is terminated, then next, in Step S105, the control section 406 determines whether or not the operation of the main function section 401 is terminated. This termination of the operation includes an operation termination of the main function section 401 by a timer, an operation termination of the main function section 401 in accordance with an operation stop instruction by the user through the input section 404, and a forced operation termination of the main function section 401 owing to the occurrence of the abnormality. The operation stop instruction by the user through the input section 404 is, for example, a pressing operation of a stop button of the electrical instrument 40 by the user.

Then, in the case where the control section 406 determines that the operation of the main function section 401 is not terminated (No in Step S105), then the control section 406 executes the abnormality monitoring processing of Step S100 one more time. Hence, the execution of the abnormality monitoring processing is repeatedly executed until the operation termination of the main function section 401.

Meanwhile, in the case where the control section 406 determines that the operation of the main function section 401 is terminated (Yes in Step S105), the control section 406 terminates the control of the electrical instrument 40.

Hence, in the case where the abnormality sensing unit 406*f* determines that the abnormality occurs in the communication section 403, and in the case where the near field communication control history is not present, then, unless other abnormality occurs, the electrical instrument 40 will operate until the operations of the main function section 401 are terminated without notifying the user of the abnormality.

As described above, in the present embodiment, the history recording unit 406*b* records the control history including the near field communication control history. Then, the notification content decision unit 406*c* decides whether or not to issue the notice on the information regarding the near field communication in accordance with whether or not the near field communication control history to be recorded in the history recording unit 406*b* is recorded in the history recording unit 406*b*. In this way, based on whether or not the near field communication control history is recorded in the history recording unit 406*b*, the notification content decision unit 406*c* can determine whether or not the user uses the electrical instrument 40 while giving the electrical instrument 40 the aspect of the main function, which is to be executed by the main function section 401, by using the information terminal 10. Then, in accordance with whether or not the near field communication control history is recorded in the history recording unit 406*b*, this notification content decision unit 406*c* decides whether or not to issue the notice on the information regarding the near field communication. Accordingly, with regard to such a user who does not use the electrical instrument while giving the electrical instrument 40 the aspect of the main function, which is to be executed by the main function section 401, by using the information terminal 10, such an unnecessary notice for the user can be prevented from being issued thereto, and eventually, the user can be prevented from being bothered by the unnecessary notice.

Specifically, in the case where the abnormality occurs in the communication section 403 of the electrical instrument 40, in the case where the near field communication control history is recorded in the history recording unit 406*b*, the notification content decision unit 406*c* determines that the user uses the electrical instrument 40 while giving the electrical instrument 40 the aspect of the main function, which is to be executed by the main function section 401, by using the information terminal 10. Then, in accordance with the decision of the notification content decision unit 406*c*, the notification content decision unit 406*c* decides to issue a notice on information including the information regarding the abnormality of the communication section 403 by the notification section 405, and the notification section 405 notifies the user of this information including the information regarding the abnormality of the communication section 403. Hence, the user who uses the electrical instrument by using the near field communication function between the information terminal 10 and the electrical instrument 40 can receive this notice on the abnormality, and can take measures such as repair of the communication section 403.

Meanwhile, in the case where the near field communication control history is not recorded in the history recording unit 406*b*, the notification content decision unit 406*c* determines that the user does not use the electrical instrument 40 while giving the electrical instrument 40 the aspect of the main function, which is to be executed by the main function section 401, by using the information terminal 10. Then, the notification content decision unit 406*c* decides not to issue the notice on the information, which includes the information regarding the abnormality of the communication section 403, by the notification section 405. Then, in accordance with the decision of the notification content decision unit 406*c*, the notification section 405 does not issue the notice on the information, which includes the information regarding the abnormality of the communication section 403, by the notification section 405. In this way, the user can be prevented from receiving the unnecessary notice and being bothered thereby.

Embodiment 2

Embodiment 2 of the present invention is an example of a form in which the electrical instrument of Embodiment 1 is revised so that the unnecessary notice can be more accurately prevented from being issued to the user who does not use the electrical instrument while giving the electrical instrument the aspect of the main function, which is to be executed by the main function section, by using the external information terminal. A description is made below of a configuration and operations of Embodiment 2 while mainly focusing different points thereof from those of Embodiment 1.

[Configuration]

Figure 5:
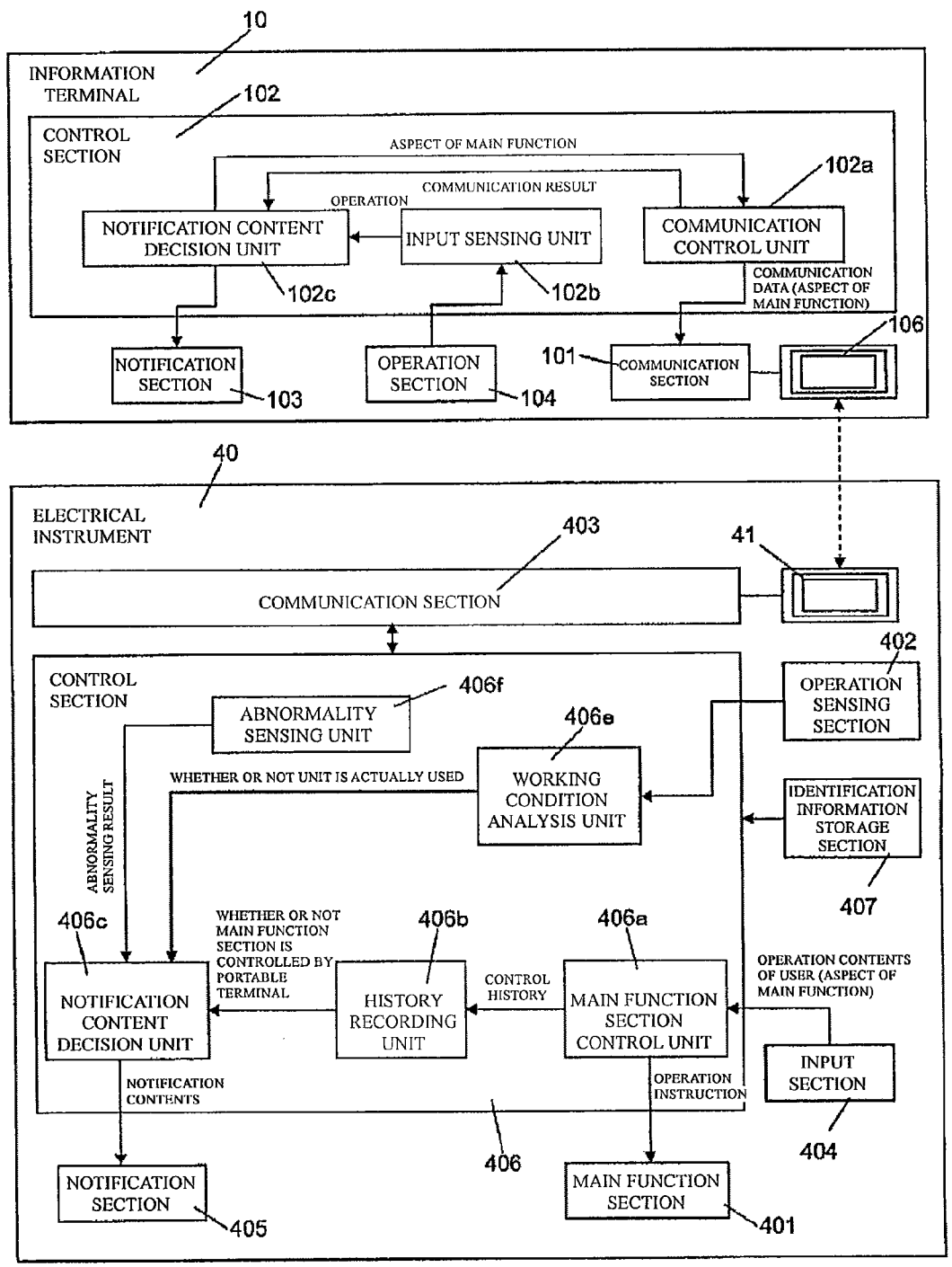
FIG. 5 is a function block diagram showing a configuration example of a system in which an electrical instrument in Embodiment 2 of the present invention is included.

FIG. 5 is a function block diagram showing a configuration example of a system in which an electrical instrument in Embodiment 2 is included.

The electrical instrument 40 of Embodiment 2 is a home electrical instrument, and further includes an operation sensing section 402. The operation sensing section 402 senses an operation result of the main function section 401, and transfers information regarding an event thus sensed to a working condition analysis unit 406*e*. This operation result is an event caused by each of the operations of the main function section 401, and stands for an event that contributes to a determination that the user uses the electrical instrument 40 in a user's life. Here, the fact that the user uses the electrical instrument 40 in the user's life stands for use of the home electrical instrument 40 under an environment originally targeted thereby. That is to say, this fact stands for use of the home electrical instrument 40 not in a trial run in a manufacturing line or in a demonstration in a shop front but at home and the like.

Moreover, the control section 406 further includes the working condition analysis unit 406*e*. The working condition analysis unit 406*e* stores and analyzes the information sensed by the operation sensing section 402, and determines whether or not the user uses the electrical instrument 40 in the user's life.

Operation Example

Figure 6:
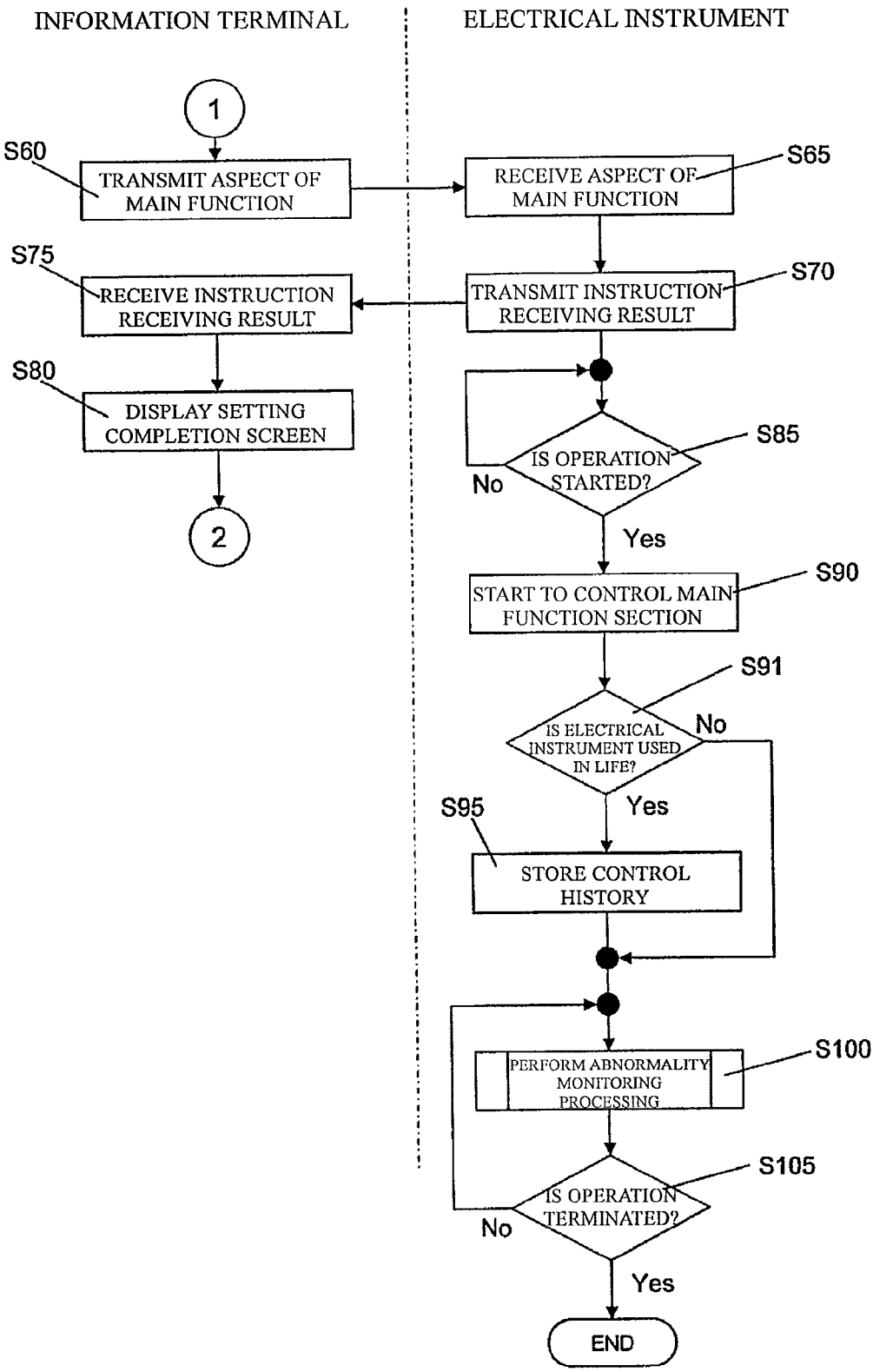
FIG. 6 is a second flowchart showing an operation example of the system in which the electrical instrument in Embodiment 2 of the present invention is included.

FIG. 6 is a second flowchart showing an operation example of an operation setting system of the home electrical instrument according to Embodiment 2 of the present invention. Note that the first flowchart showing the operation example of the operation setting system of the home electrical instrument in the present embodiment is similar to the flowchart of Embodiment 1, which is shown in FIG. 2, and accordingly, this is incorporated herein by reference.

First, Step S10 of FIG. 2 to Step S55 thereof are executed sequentially, and further, Step S60 of FIG. 6 to Step S80 thereof and Step S85 thereof to Step S90 thereof are executed sequentially; however, these are similar to those of Embodiment 1, and accordingly, are assigned with the same reference numerals, and a description thereof is omitted.

Then, after Step S90, the working condition analysis unit 406*e* determines whether or not the electrical instrument 40 has been used before in the user's life.

Then, in the case where the working condition analysis unit 406*e* determines, from the information stored thereby, that the electrical instrument 40 has been used before in the user's life (Yes in Step S91), then the history recording unit 406*b* records the control history (Step S95). Note that, in the case where the working condition analysis unit 406*e* once determines that the electrical instrument 40 has been used in the user's life, then Steps S91 and 95 may be steps in which the working condition analysis unit 406*e* does not perform the determination that the electrical instrument 40 has been used in the user's life, and the history recording unit 406*b* automatically records the control history. That is to say, in the present embodiment, in the case where the working condition analysis unit 406*e* determines that the electrical instrument 40 has been used in the user's life, the history recording unit 406*b* starts to record the control history.

Note that, in the present embodiment, the working condition analysis unit 406*e* determines that the electrical instrument 40 has been used before in the user's life; however, the working condition analysis unit 406*e* is not limited to this. The working condition analysis unit 406*e* may determine whether or not the electrical instrument 40 has been used this time in the user's life.

Meanwhile, in the case where the working condition analysis unit 406*e* determines that the electrical instrument 40 has not been used in the user's life up to now (No in Step S91), the history recording unit 406*b* executes the abnormality monitoring processing of Step S100 without recording the control history.

Operations on and after Step S100 are similar to those of Embodiment 1, and accordingly, are assigned with the same reference numerals, and a description thereof is omitted.

As described above, in the present embodiment, in the electrical instrument 40, the operation sensing section 402 senses the operation result of the main function section 401, and the working condition analysis unit 406*e* stores and analyzes this, and determines whether or not the user has used the electrical instrument 40 in his/her life. Hence, a control history in an event where the electrical instrument 40 has been used by using the near field communication function between the information terminal 10 and the electrical instrument 40 in a factory or the shop front can be prevented from being recorded in the history recording unit 406*b*. In this way, the use of the electrical instrument 40 in the user's life and the use thereof in other scene can be distinguished from each other. Therefore, the unnecessary notice can be more accurately prevented from being issued to the user who does not use the electrical instrument 40 by using the near field communication between the information terminal 10 and the electrical instrument 40 in his/her life.

Embodiment 3

Figure 7:
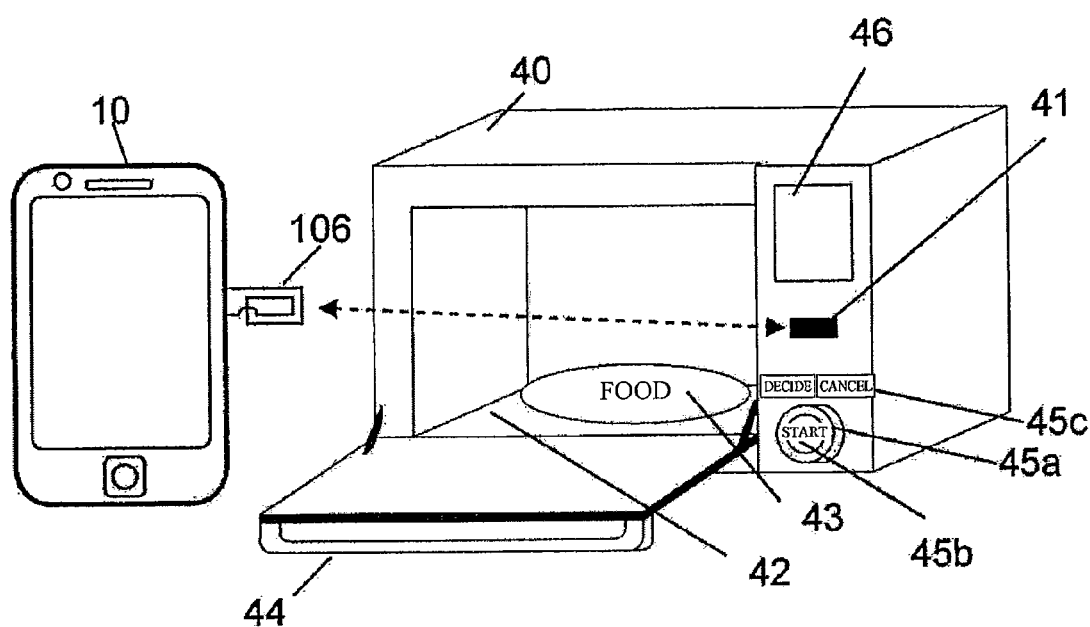
FIG. 7 is a view showing a configuration example of a whole of a system in which an electrical instrument in Embodiment 3 of the present invention is included.

Embodiment 3 of the present invention is an example of a form in which the electrical instrument of Embodiment 2 is a microwave oven. A description is made below of a configuration and operations of Embodiment 3 while mainly focusing different points thereof from those of Embodiment 2. FIG. 7 is a view showing a configuration example of a whole of a system in which an electrical instrument in Embodiment 3 of the present invention is included. This system includes the information terminal 10 and such a microwave oven (home heating cooking device) as the electrical instrument 40.

As mentioned above, the electrical instrument 40 is the electrical instrument communicable with the information terminal 10 through the loop antenna 41 by the RFID or the NFC. Then, the electrical instrument 40 is an instrument that heats food 43 housed in a heating chamber (cabinet) 42. The user puts the food 43 into the heating chamber 42, closes a door 44, operates a jog dial 45*a* as an input section, thereby selects contents of cooking to be implemented, and presses a start key 45*b*, and can thereby perform cooking (heating). Operation contents on the jog dial 45*a* are displayed on a liquid crystal panel 46 as the notification section.

Moreover, in the present embodiment, not by operating the input section 404 including the jog dial 45*a*, but by sending the contents of the cooking to be implemented (that is, the aspect of the main function) from the information terminal 10 into the electrical instrument 40, the contents of cooking (heating) are set, and the start key 45*b* is then pressed, whereby the heating can be performed. Note that the electrical instrument 40 may be an oven including a heater in the heating chamber 42. Then, in a case of discontinuing the heating, a cancel key 45*c* is operated, whereby the heating is discontinued.

Figure 8:
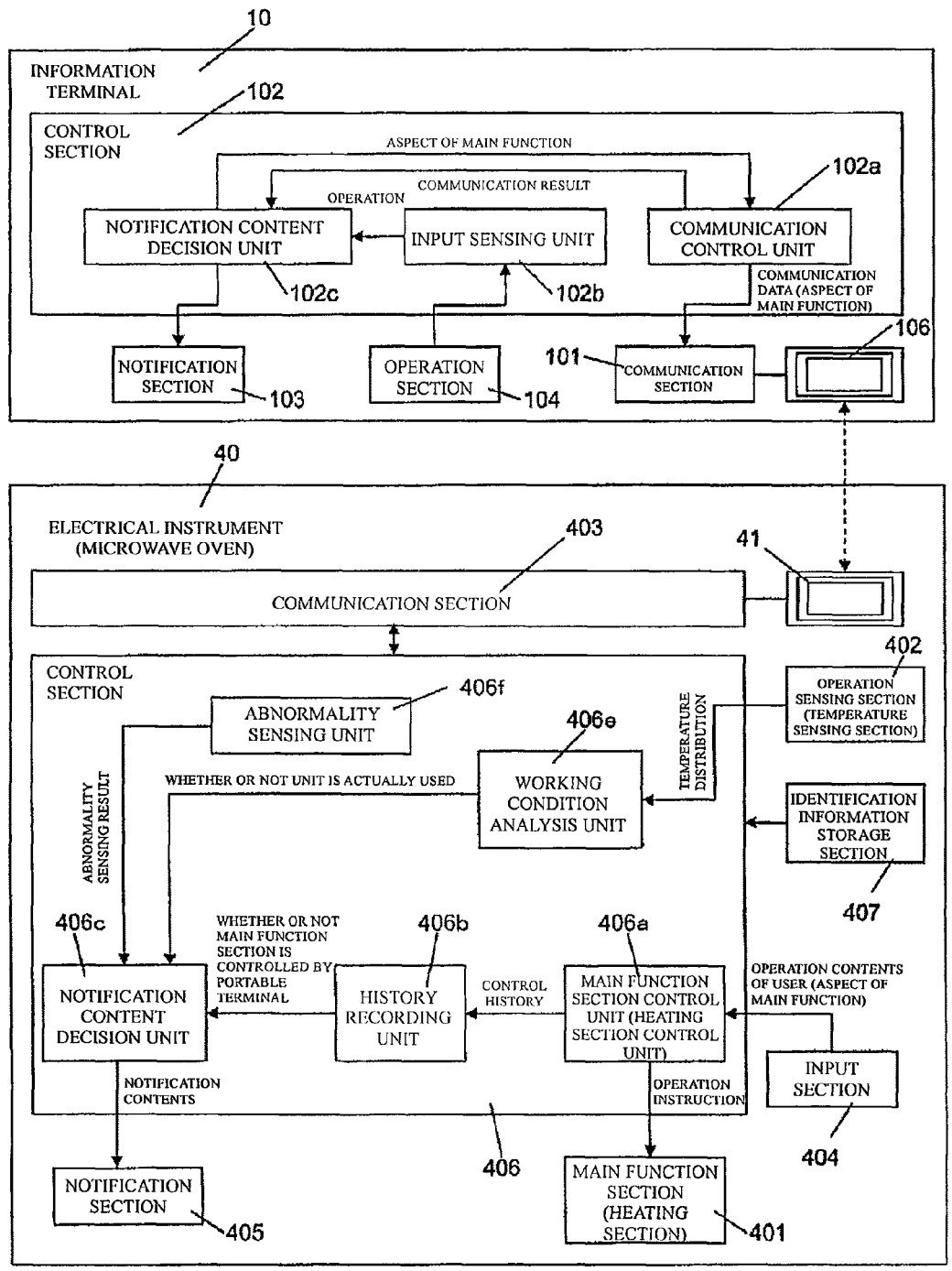
FIG. 8 is a function block diagram showing a configuration example of the system in which the electrical instrument in Embodiment 3 of the present invention is included.

FIG. 8 is a view showing a detailed configuration example of a system in which the electrical instrument in Embodiment 3 is included.

In the present embodiment, the information terminal 10 is a so-called smart phone, which has the near field communication function such as the RFID (Radio Frequency IDentification) or the NFC (Near Field Communication) and is capable of installing an external application therein.

Other configurations of the information terminal 10 are similar to those of Embodiment 2, and accordingly, a detailed description thereof is omitted.

The main function section 401 of the electrical instrument 40 is a heating section, and the operation sensing section 402 is a temperature sensing section.

The main function section 401 is a section heating the food, which is housed in the heating chamber 42 of the electrical instrument 40, by irradiating the food with a microwave.

The operation sensing section 402 is a section that senses a temperature of the heating chamber 42 of the microwave oven, and for example, is an infrared sensor that senses infrared rays discharged from the food heated in the microwave oven, or the like. In the present embodiment, the operation sensing section 402 senses a temperature distribution of the heating chamber 42 of the microwave oven by a thermopile sensor; however, the operation sensing section 402 is not limited to this.

In the present embodiment, the input section 404 is the jog dial 45*a* and the start key 45*b*.

The notification section 405 is the liquid crystal panel 46.

The control section 406 is a microcomputer, and includes a memory (not shown) that houses a program created in advance in order to operate the electrical instrument 40, data and the like.

If the main function section control unit 406*a* controls the main function section 401 as the heating section, and the temperature distribution in the cabinet of the microwave oven is changed by the heating, then the working condition analysis unit 406*e* determines that the food is put into the cabinet of the microwave oven, that the main function section 401 operates normally, and that the food is warmed, and determines that the user uses the electrical instrument 40 in his/her life.

In this way, use of the electrical instrument 40 in a trial run in a manufacturing line, a demonstration run in a shop front, and the like, in which the electrical instrument 40 as the microwave oven is frequently run without putting the food into the heating chamber thereof, and use of the electrical instrument 40 in the user's life can be distinguished from each other. In this way, the near field communication control history received by the communication section 403 in the use of the electrical instrument 40 in the trial run in the manufacturing line, the demonstration run in the shop front, and the like is stored in a history storage unit. As a result, based on this history, the unnecessary notice can be more accurately prevented from being issued to the user who does not give the electrical instrument 40 the aspect of the main function by using the information terminal 10 in the life.

Note that, also in the case where the main function section control unit 406*a* controls the main function section 401 as the heating section, and the temperature distribution in the heating chamber 42 of the microwave oven is changed by the heating, the working condition analysis unit 406*e* may store a pattern of a change of a temperature distribution in a case of heating a predetermined article, may determine that the user does not use the electrical instrument 40 in his/her life if a pattern of the change actually measured is the same as the stored pattern. In this way, if the predetermined article is heated in the trial run in the manufacturing line, the demonstration run in the shop front, and the like after the pattern of the change of the temperature distribution in the case of heating this article is stored, then such use of the electrical instrument 40 in the trial run, the demonstration run and the like and the use thereof in the user's life can be distinguished from each other.

Other configurations of the information terminal 10 and the electrical instrument 40 are similar to those of Embodiment 2, and accordingly, a detailed description thereof is omitted.

Operation Example

Next, a description is made of operations of the electrical instrument 40 in the embodiment of the present invention.

Operations of a system in which the electrical instrument 40 in the embodiment of the present invention is included are similar to those of Embodiment 2, and accordingly, are described by using FIGS. 2 to 4.

First, in Step S10, the control section 102 of the information terminal 10 starts the application for inputting the aspect of the main function to the electrical instrument 40.

Next, when the application is started, then in Step S15, the notification content decision unit 102c controls the notification section 103 to display the communication instruction screen that guides the user to bring the communication section 101 and the electrical instrument 40 close to each other in order that the communication section 101 and the electrical instrument 40 can communicate with each other. Then, the notification section 103 displays the communication instruction screen.

Figure 10:
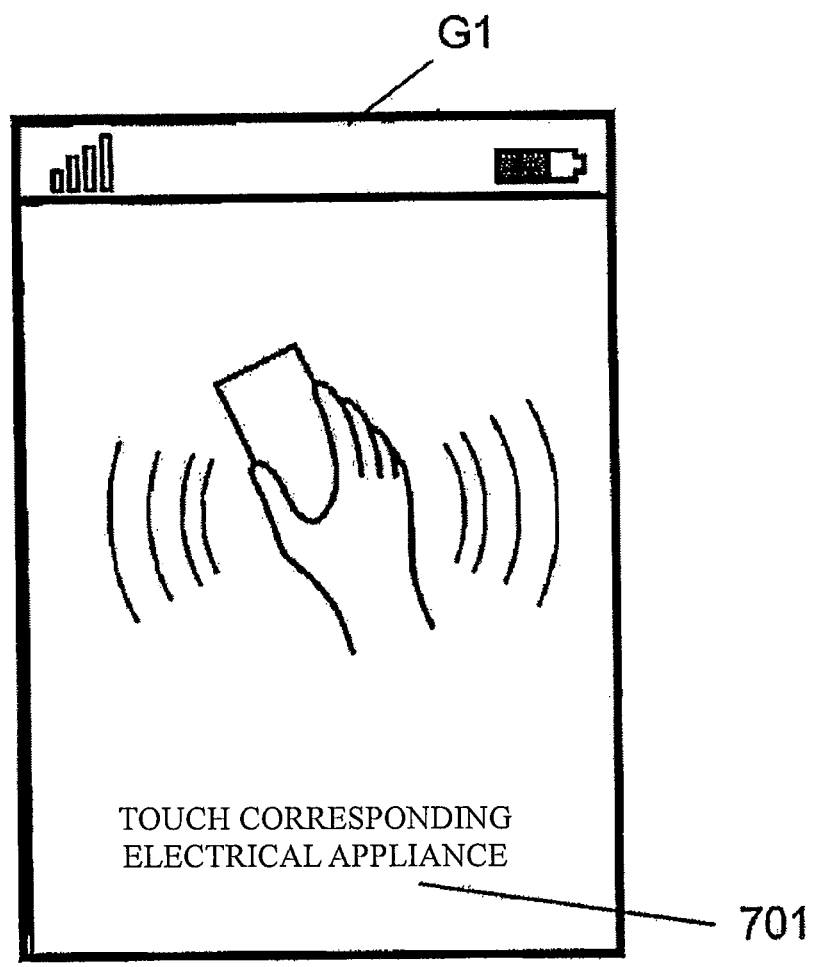
FIG. 10 is a view showing an example of a communication instruction screen in Embodiment 3 of the present invention.

FIG. 10 is a view showing an example of the communication instruction screen in the present embodiment. On the communication instruction screen G1 shown in FIG. 10, for example, a message 701 saying "Touch the corresponding electrical appliance" is displayed. The communication instruction screen G1 is a screen that guides the user to bring the communication terminal 10 close to the electrical instrument 40. When the communication instruction screen G1 is displayed on the notification section 103 of the information terminal 10, the user brings the loop antenna 106 of the information terminal 10 and the loop antenna 41 of the electrical instrument 40 close to each other so that the information terminal 10 and the electrical instrument 40 can get close to each other by a distance at which these are communicable with each other by the near field communication.

Step S20 to Step S40 are similar to those of Embodiments 1 and 2, and accordingly, a description thereof is omitted.

Note that, in an event where the request information is received in Step S25, such an operation of enabling the electrical instrument 40 to receive the request information is implemented therebefore by the user. In the present embodiment, the operation of enabling the electrical instrument 40 to receive the request information refers to an operation of setting the state where the electrical instrument 40 is turned on, that is, of connecting the plug thereof to the commercial power supply, and in addition, of opening a door of the electrical instrument 10 and turning a backlight of the liquid crystal display of the notification section 103 to a lighted state.

Next, in Step S45, the notification content decision unit 102c creates an input screen corresponding to the electrical instrument 40 identified by the electrical instrument identification information, and performs control to display this input screen on the notification section 103.

Figure 11:
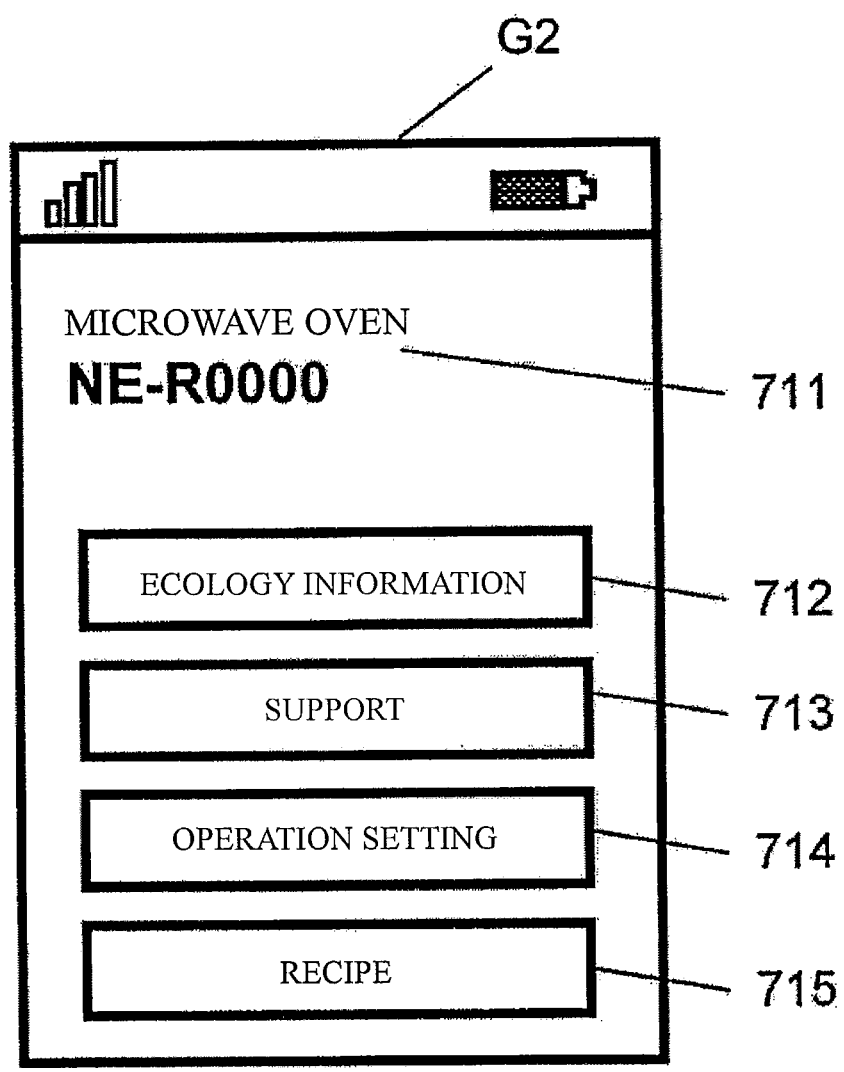
FIG. 11 is a view showing an example of an input screen in Embodiment 3 of the present invention.
Figure 12:
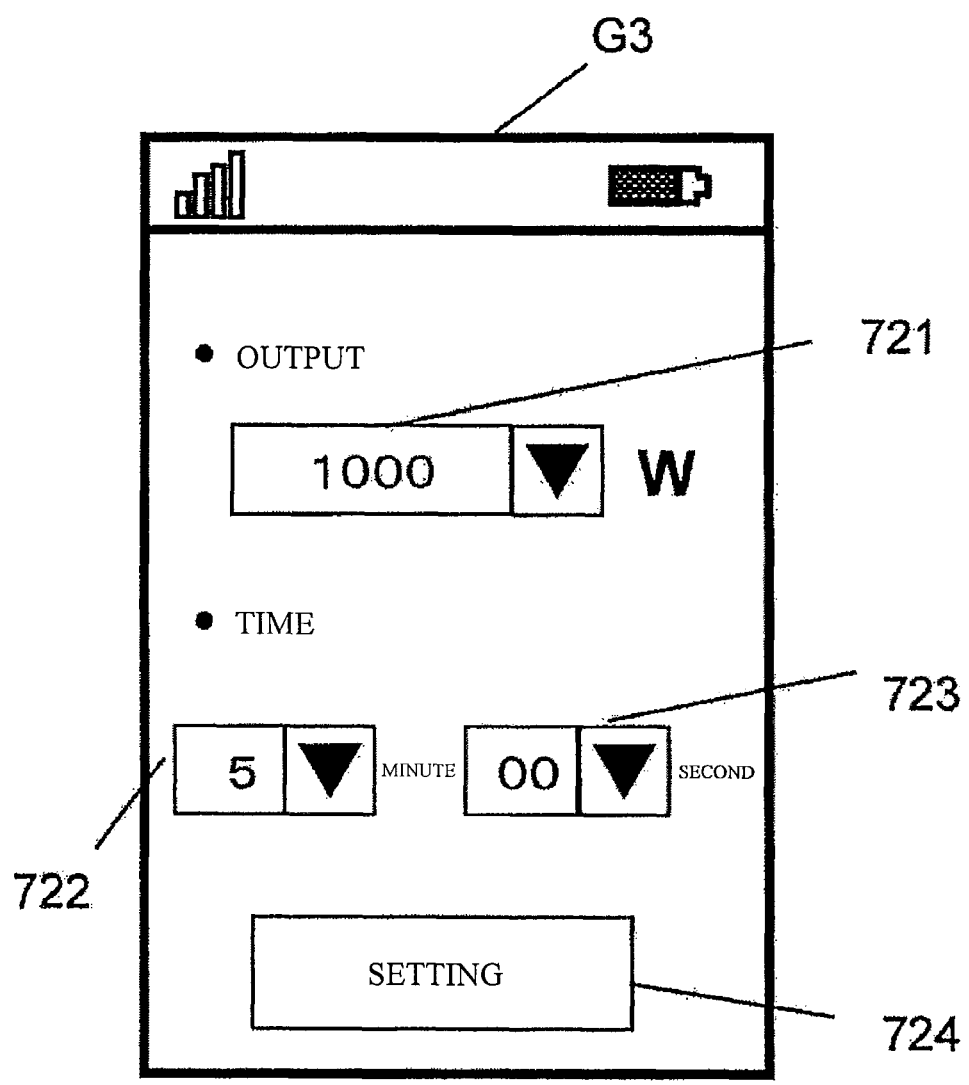
FIG. 12 is a view showing an example of the input screen in Embodiment 3 of the present invention.

FIGS. 11 and 12 are views showing examples of input screen in the present embodiment.

The input screen shown in FIG. 11 is a menu screen G2. On this menu screen G2, there are displayed: a product name 711 that represents a product name and product number of the electrical instrument 40; an ecology information display button 712 for displaying information regarding an energy saving state of the electrical instrument 40; a support information display button 713 for displaying support information of the electrical instrument 40; an operation setting button 714 for setting operations (an output of a radio wave, an operating time, and the like) of the microwave oven; and a recipe button 715 capable of searching a recipe of cooking made by using the microwave oven.

The ecology information display button 712, the support information display button 713, the operation setting button 714 and the recipe button 715 are selectable through the operation unit 104. When the ecology information display button 712 is selected, a screen that shows information regarding energy saving, such as a power consumption of the electrical instrument 40, is displayed. When the support information display button 713 is selected, a screen that shows information for supporting the electrical instrument 40 is displayed. When the operation setting button 714 is selected, an instruction content selection screen to be described later is displayed, and a screen for inputting the aspect of the main function of the main function section 401 of the electrical instrument 40 is displayed. Moreover, when the recipe button 715 is selected, a recipe selection screen is displayed.

Note that items to be displayed on the menu screen G2 are not limited to the items shown in FIG. 11, and the menu screen G2 is capable of displaying a variety of items.

Next, in Step S50, the information terminal 10 performs the instruction receiving processing for receiving the user's instruction to the electrical instrument 40.

Figure 9:
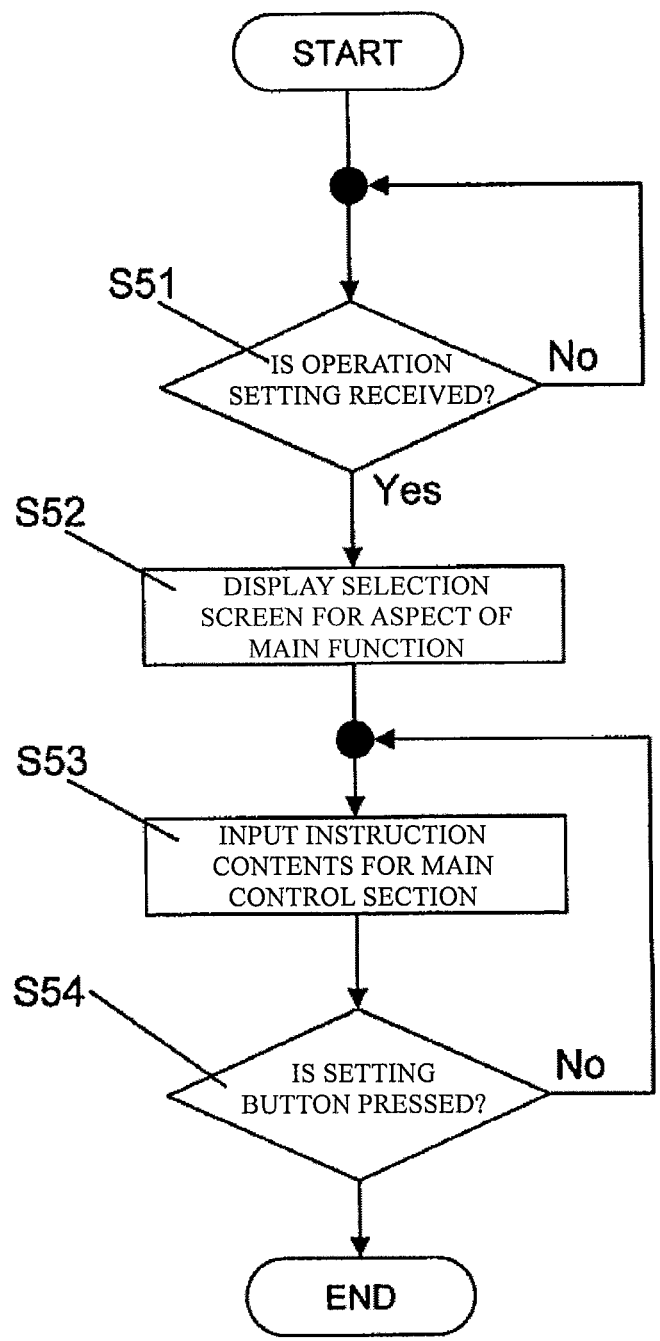
FIG. 9 is a flowchart showing an operation example of instruction receiving processing of the system in which the electrical instrument in Embodiment 3 of the present invention is included.

FIG. 9 is a flowchart showing an operation example of the instruction receiving processing in the present embodiment.

The instruction receiving processing is executed as follows.

First, in Step S51, the input sensing unit 102b determines whether or not the operation setting is received by the operation section 104. That is to say, the notification content decision unit 102c determines whether or not the operation setting button 714 displayed on the menu screen G2 is selected.

Here, in the case where it is determined that the operation setting is not received (No in Step S51), the notification content decision unit 102c is on standby until the operation setting is received. Note that, for example, in the case where other instruction to the ecology information display button 712, the support information display button 713, the recipe button 715 or the like is received in the standby state, then display of the screen, an operation of the information terminal 10 and an operation of the electrical instrument 40, which correspond to the other instruction, are performed.

Meanwhile, in the case where it is determined that the operation setting is received (Yes in Step S51), then in Step S52, the notification content decision unit 102c controls the notification section 103 to display the instruction content selection screen for allowing the user to input the aspect of the main function of the main function section 401 of the electrical instrument 40. The notification section 103 displays the instruction content selection screen.

On an instruction content selection screen G3 shown in FIG. 12, there are displayed: a list 721 for use in selecting output wattage; a list 722 for use in selecting the operating time (minute); a list 723 for use in selecting the operating time (second); and a setting button 724 for setting the selected aspect of the main function to the electrical instrument 40. When the setting button 724 is selected, the communication instruction screen of FIG. 10 is displayed.

In the present embodiment, the user can select four types, which are "1000 W, 800 W, 600 W and 300 W" from the list 721 for the output wattage by a touch panel operation. Moreover, by a touch panel operation, the user can select the operating time from "1 second" to "59 minutes 59 seconds" from the lists 722 and 723 for setting the operating time. In FIG. 12, a screen of a state where the 1000 W is selected as the output wattage and "5 minutes" is selected as the operating time is displayed as the aspect of the main function.

Next, in Step S53, the user operates the touch panel, and inputs the aspect of the main function. In the present embodiment, as shown in FIG. 12, the aspect of the main function, in which the output wattage is 1000 W, and the operating time is 5 minutes, is inputted.

Next, the input of the aspect of the main function is received until the user touches the setting button 724 (Steps S53, 54).

Then, when the user touches the setting button 724, the instruction receiving processing is terminated.

Step S55 to Step S80 are similar to those of Embodiments 1 and 2, and accordingly, a description thereof is omitted.

Figure 13:
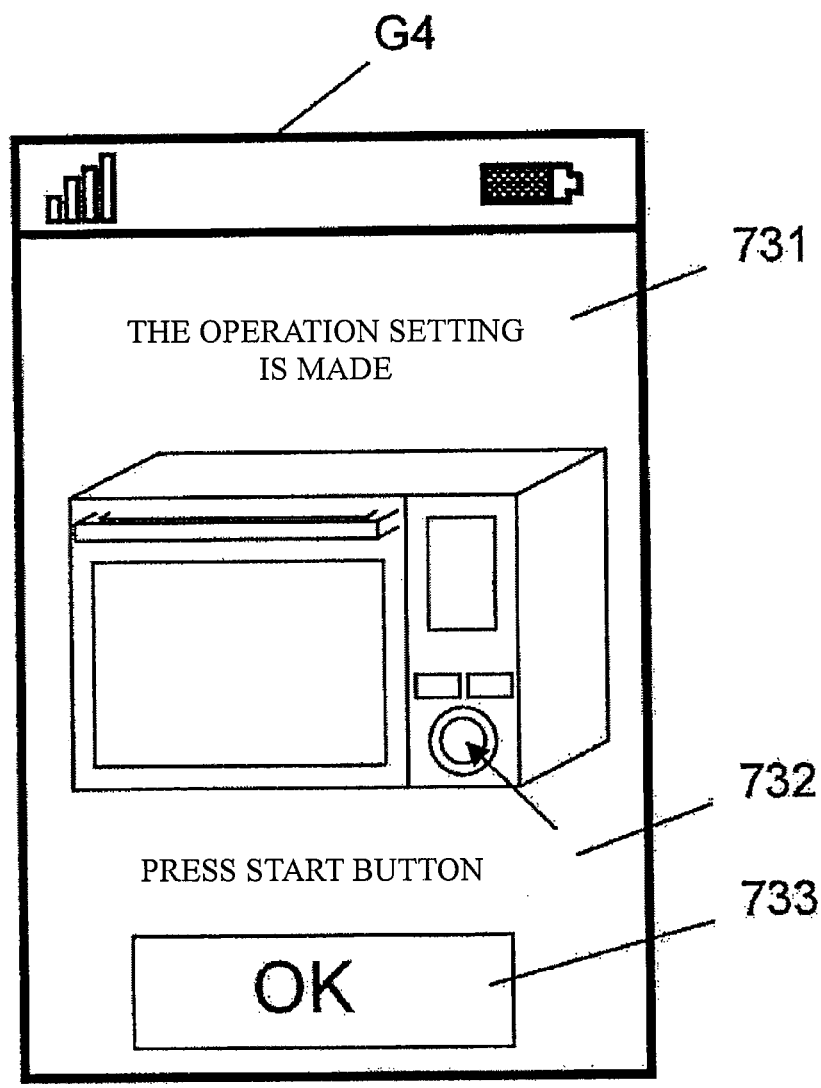
FIG. 13 is a view showing an example of a setting completion screen in Embodiment 3 of the present invention.

Note that an example of a setting completion screen in Step S80 is shown in FIG. 13.

A screen G4 shown in FIG. 13 is an example of a setting completion screen in the case where the communication has succeeded. On the screen G4, there are displayed: a message 731 saying "The operation setting is made": a message 732 saying "Press the start button"; and an OK button 733 for returning to the menu screen G2. The message 732 is a message that guides the user to press the start key 45b of the electrical instrument 40 and to start the cooking. The OK button 733 is a button for, by the touch thereto by the user, returning to the processing of Step S45 and allowing the control section 102 to display the input screen corresponding to the electrical instrument 40.

Meanwhile, after transmitting the instruction receiving result in Step S70, the control section 406 of the electrical instrument 40 is on standby in Step S85 until the user presses the start key 45b.

Then, when the user presses the start key 45b, then in Step S90, the main function section control unit 406a starts to control the main function section 401 to operate in accordance with the aspect of the main function. That is to say, the main function section control unit 406a starts to control the main function section 401 to operate with the output of 1000 W and the operating time of 5 minutes. At the same time when the control for the main function section 401 is started, the operation sensing section 402 starts to sense the temperature distribution in the cabinet of the electrical instrument 40.

Next, in Step S91, the working condition analysis unit 406e determines whether or not the temperature distribution has been changed in the previous operation in such a manner that the food is put into the cabinet of the electrical instrument 40 and is heated by the main function section 401 as the heating section in the user's life.

That is to say, in the case where the food has been housed in the cabinet of the electrical instrument 40 in the previous operation, then a temperature of the food rises following the operation of the electrical instrument 40, and the temperature distribution is changed. Hence, in such a case, it is determined that the electrical instrument 40 is used in the user's life (Yes in Step S91 of FIG. 6). Meanwhile, in the case where the food has not been housed in the cabinet of the electrical instrument 40, the temperature distribution is not changed following the operation of the electrical instrument 40. Hence, in such a case, it is determined that the electrical instrument 40 is not used in the user's life (No in Step S91 of FIG. 6).

Then, only in the case where the working condition analysis unit 406e determines that the electrical instrument 40 is used in the user's life, the history recording unit 406b records the control contents, which are performed by the main function section control unit 406a, as the control history in Step S95. In the present embodiment, the history recording unit 406b records the control history that the main function section control unit 406a has controlled the main function section 401 with the output wattage of 1000 W and the operating time of 5 minutes based on the aspect of the main function, which is received by the communication section 403.

Note that, in the present embodiment, in the case where the user operates the main function section 401 by an operation to the input section 404, control contents, which the main function section control unit 406a has performed by the operation to the input section 404, are recorded as the control history. For example, in the case where an output of 600 W and an operating time of 10 minutes are inputted by the operation to the input section 404, a control history that the control has been performed with the output of 600 W and the operating time of 10 minutes by the operation to the input section 404 is recorded.

Steps S100 and S105 are similar to Embodiments 1 and 2, and accordingly, a description thereof is omitted.

Note that the determination in Step S105 of the present embodiment is performed by determining whether or not 5 minutes as the setting time has elapsed, or by determining whether or not the operation of the electrical instrument 40 is forcibly stopped by the user.

Embodiment 4

Embodiment 4 of the present invention is an example of a form in which Embodiment 3 is revised so that a user who, less frequently uses the near field communication function between the external information terminal and the electrical instrument though uses the electrical instrument by using the near field communication function concerned, can be prompted to implement the communication between the external information terminal and the electrical instrument. A description is made below of a configuration and operations of Embodiment 4 while mainly focusing different points thereof from those of Embodiment 3.

[Configuration]

Figure 14:
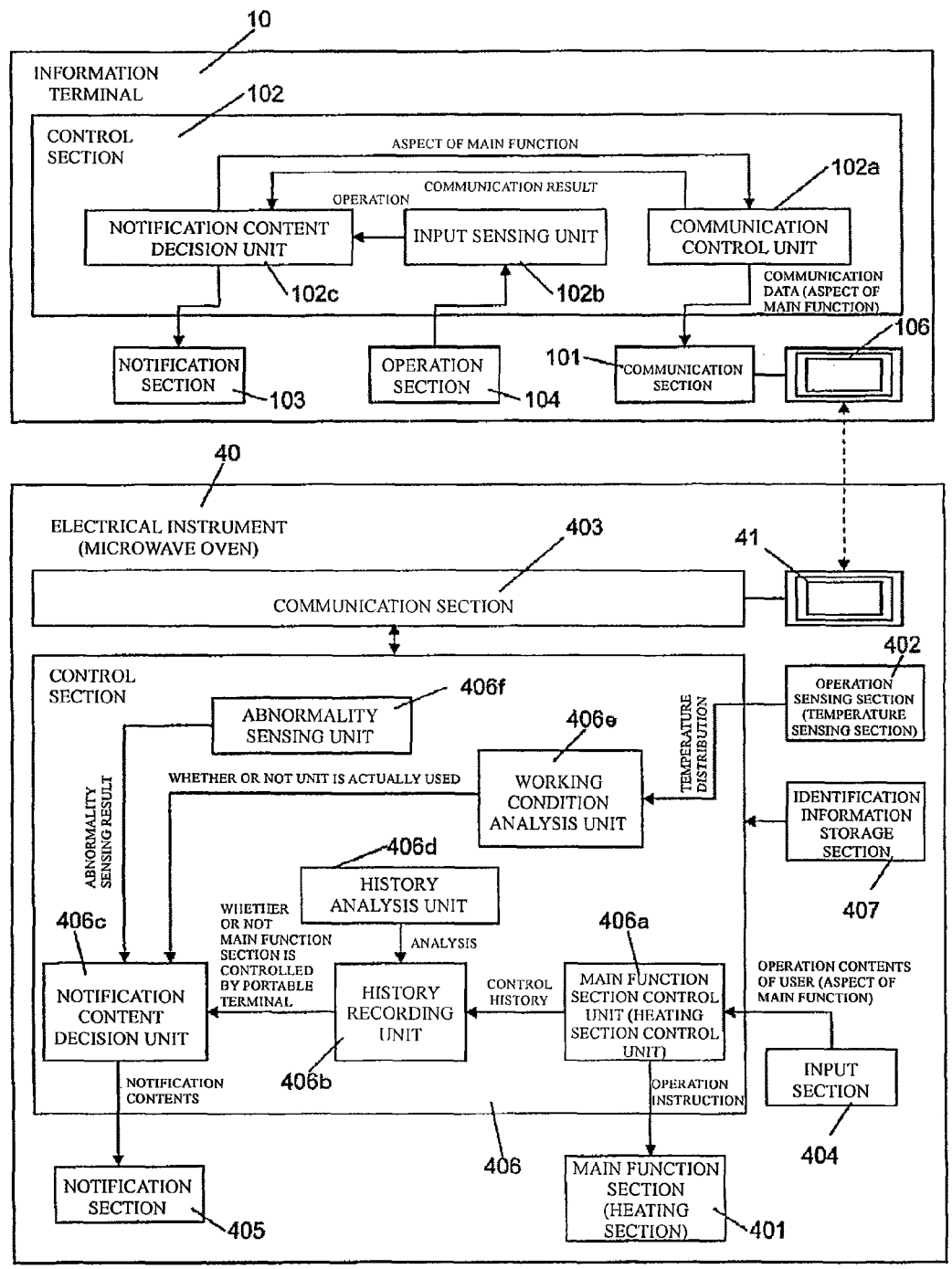
FIG. 14 is a function block diagram showing a configuration example of a system in which an electrical instrument in Embodiment 4 of the present invention is included.

FIG. 14 is a function block diagram showing a configuration example of a system in which an electrical instrument of Embodiment 4 is included.

As shown in FIG. 14, a control section 406 of an electrical instrument 40 of Embodiment 4 further includes a history analysis unit 406d that, based on the near field communication control history and the input control history, which are recorded in the history recording unit 406b, analyzes a relative frequency (hereinafter, sometimes referred to as a near field communication control relative frequency) of the fact that the main function section control unit 406a has controlled the main function section 401 based on the aspect of the main function, which is received by the communication section 403, to the fact that the main function section control unit 406a has controlled the main function section 401 based on the aspect of the main function, which is inputted to the input section 404.

Operation Example

Figure 15:
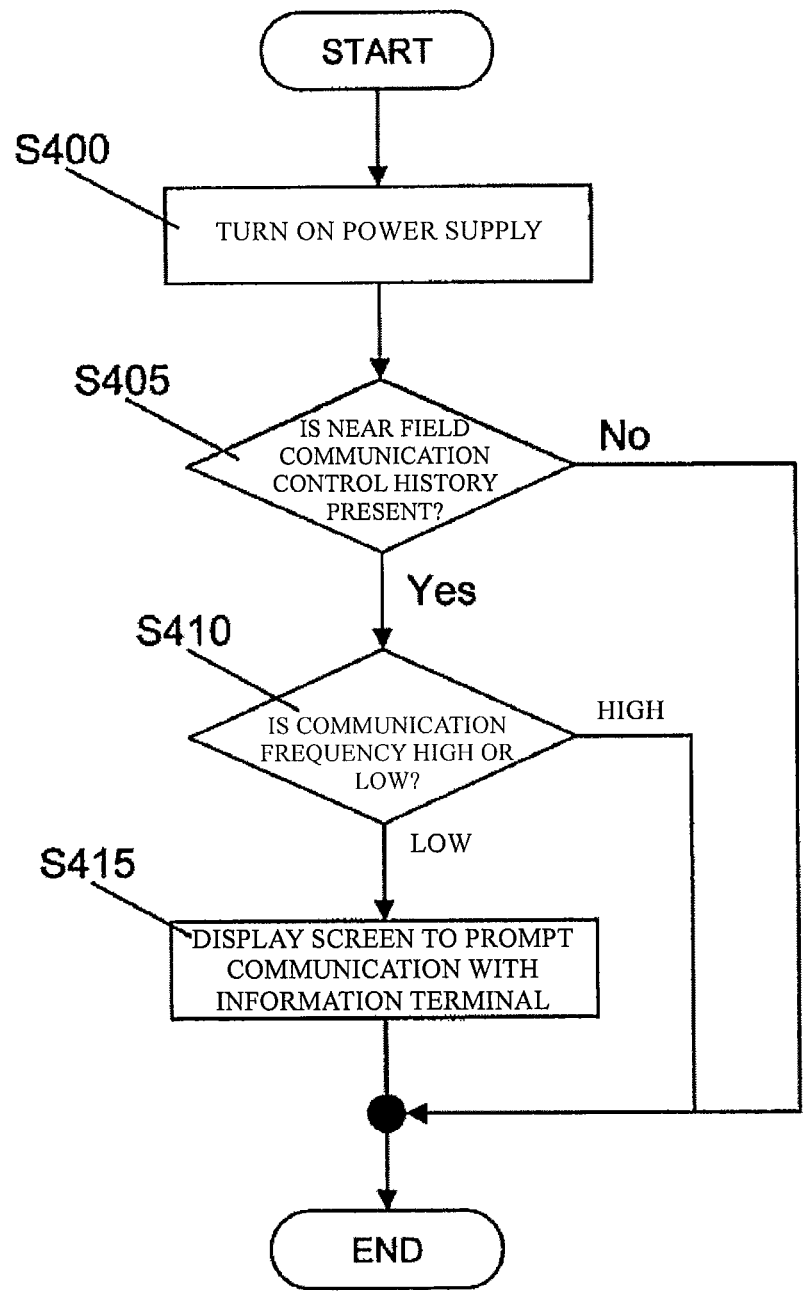
FIG. 15 is a flowchart showing an operation example of the electrical instrument in Embodiment 4 of the present invention.

FIG. 15 is a flowchart showing an operation example of Embodiment 4 of the present invention. This flowchart is a chart showing processing performed when the electrical instrument 40 is turned on.

First, in Step S400, the electrical instrument 40 is turned on by the user.

Next, in Step S405, the notification content decision unit 406c analyzes the control history recorded in the history recording unit 406b, and determines whether or not the near field communication control history is recorded in the history recording unit 406*b*. Then, in the case where the notification content decision unit 406*c* determines that the near field communication control history is not recorded in the history recording unit 406*b* (No in Step S405), the control section 406 terminates the processing performed when the electrical instrument 40 is turned on, and enters a standby state.

Meanwhile, in the case where the notification content decision unit 406*c* determines that the near field communication control history is recorded in the history recording unit 406*b* (Yes in Step S405), the history analysis unit 406*d* analyzes the control history recorded in the history recording unit 406*b*, and determines whether the near field communication control relative frequency is higher than a predetermined value or the near field communication control relative frequency is lower than the predetermined value (Step S410).

Then, specifically, for example, in the present embodiment, it is determined that a communication frequency is low in the case where the main function section 401 is never controlled based on the aspect of the main function, which is transmitted from the information terminal 10, in recent 30-time histories, and it is determined that the communication frequency is high otherwise. However, such a determination method is not limited to this, and for example, the communication frequency may be determined based on all of the control histories of the main function section 401.

Then, in the case where the history analysis unit 406*d* determines that the communication frequency between the information terminal 10 and the electrical instrument 40 is high (high in Step S410), then the control section 406 terminates the processing performed when the electrical instrument 40 is turned on, and enters the standby state.

Figure 16:
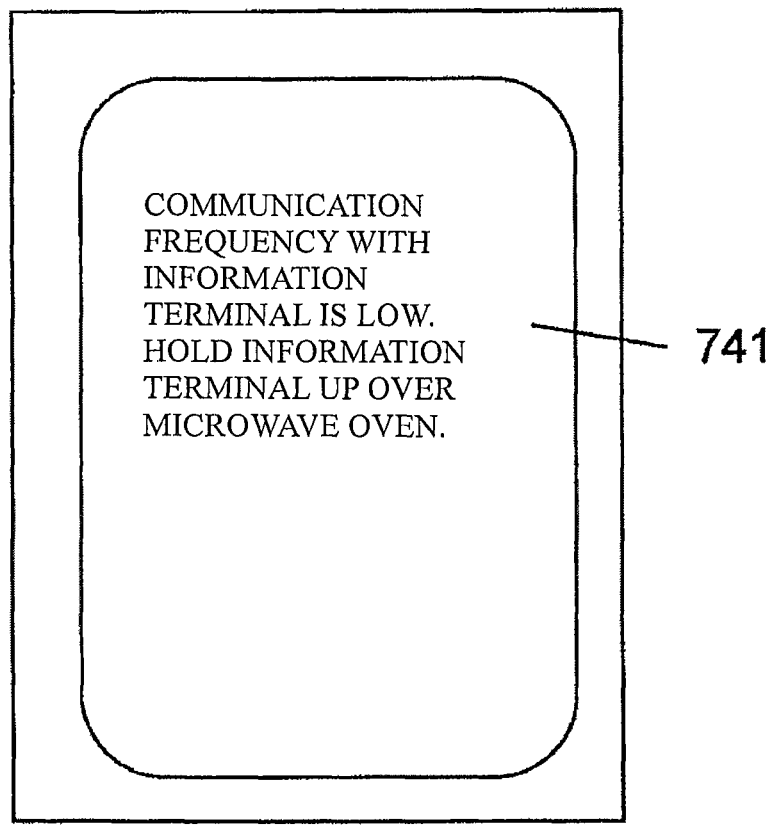
FIG. 16 is a view showing an example of a screen that prompts implementation of communication between an external information terminal and the electrical instrument in Embodiment 4 of the present invention.

Meanwhile, in the case where the history analysis unit 406*d* determines that the communication frequency between the information terminal 10 and the electrical instrument 40 is low (low in Step S410), then the notification content decision unit 406*c* decides so that the user notification information can include prompting of the implementation of the communication between the information terminal 10 and the electrical instrument 40, and the notification section 405 notifies the user of this user notification information (Step S415). In the present embodiment, the notification content decision unit 406*c* decides, as the user notification information, a message having contents to prompt the implementation of the communication between the information terminal 10 and the electrical instrument 40, and the notification section 405 displays this message. FIG. 16 is an example of a display screen to prompt the implementation of the communication between the information terminal 10 and the electrical instrument 40. As shown in FIG. 16, the notification content decision unit 406*c* displays a message 741, which says "Communication frequency with the information terminal is low. Hold the information terminal up over the microwave oven", as a pop-up on the screen of the notification section 405. Note that the notice to prompt the implementation of the communication between the information terminal 10 and the electrical instrument 40 is not limited to this, and in place of this, a configuration may be adopted so that a notice can be issued, in which an LED mounted on the electrical instrument 40 blinks or turns on.

Then, in the present embodiment, as mentioned above, the notice to prompt the implementation of the communication between the information terminal 10 and the electrical instrument 40 is issued immediately after the electrical instrument 40 is turned on; however, such notification is not limited to this. For example, a configuration may be adopted so that the notice can be issued during the operation of the main function section 401. Moreover, a configuration may be adopted so that the notice can be issued when a door switch (not shown) of the electrical instrument 40 senses closing of a door after the user opens a door of the microwave oven and takes out the food from the heating chamber 42 after the heating of the food is ended.

As described above, in the case where the main function section 401 has been controlled based on the aspect of the main function, which is transmitted from the information terminal 10, further in the case where the near field communication control frequency between the information terminal 10 and the electrical instrument 40 is lower than the predetermined value, the electrical instrument 40 of the present embodiment decides so that the user notification information can include the prompting of the implementation of the communication between the information terminal 10 and the electrical instrument 40, and the notification section 405 notifies the user of this user notification information. Hence, the user, who less frequently uses the near field communication function between the external information terminal and the electrical instrument though uses the electrical instrument by using the near field communication function concerned, can be prompted to implement the communication between the information terminal 10 and the electrical instrument 40.

Embodiment 5

A description is made below of a configuration and operations of Embodiment 5 while mainly focusing different points thereof from those of Embodiment 3.

Figure 17:
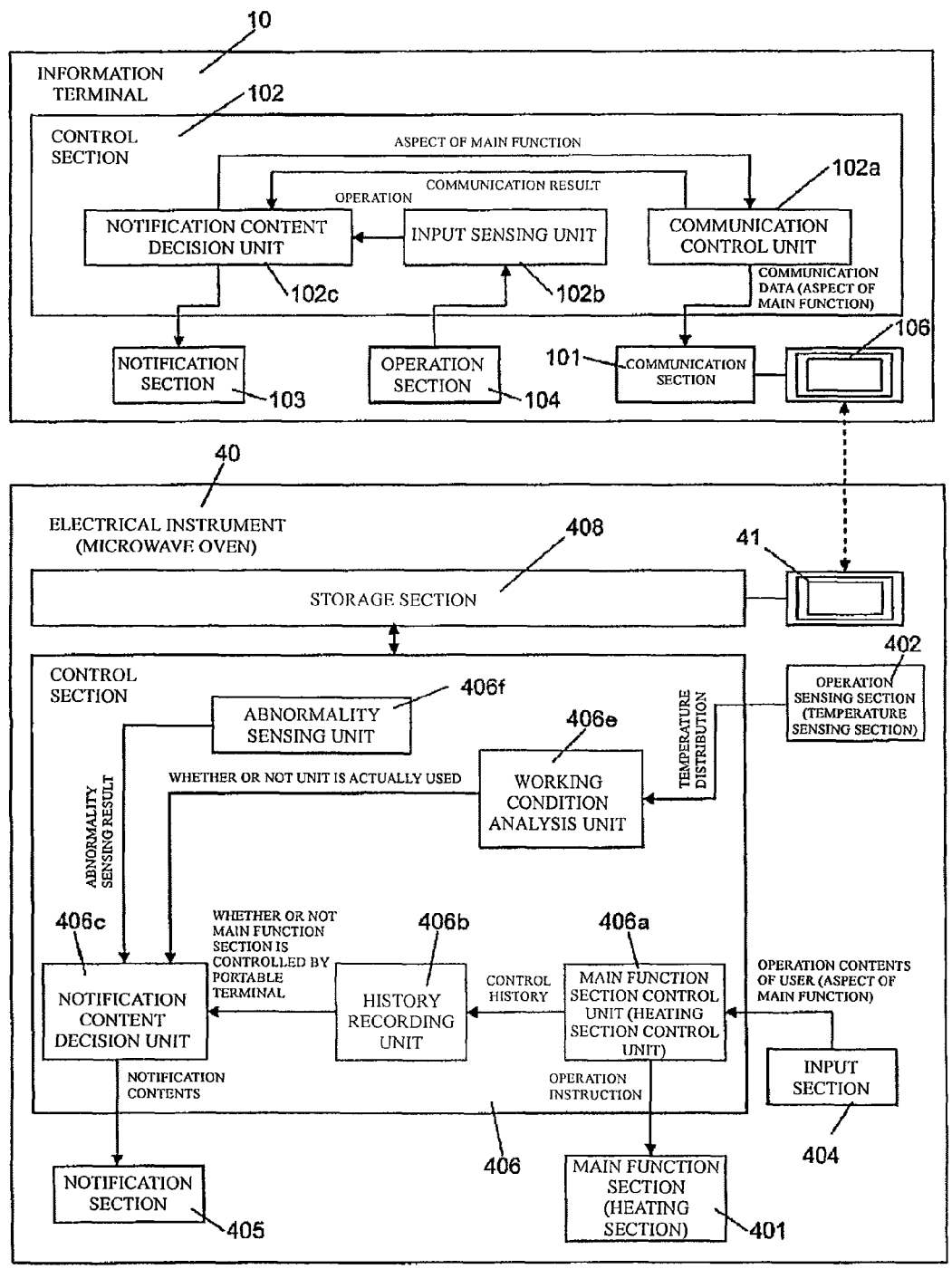
FIG. 17 is a function block diagram showing a configuration example of a system in which an electrical instrument in Embodiment 5 of the present invention is included.

FIG. 17 is a function block diagram showing a configuration example of a system in which an electrical instrument of Embodiment 5 is included.

Embodiment 5 is different from Embodiment 3 in that, while the electrical instrument 40 of Embodiment 3 includes the communication section 403, an electrical instrument 40 of Embodiment 5 does not include the communication section, but includes a storage section 408 separately in place of this. This storage section 408 is configured so as to be capable of readout and write by the near field communication from the information terminal 10 to the storage section 408, and in addition, so as to be capable of readout and write by wired communication from the control section 406 of the electrical instrument 40 to the storage section 408 thereof. Moreover, the electrical instrument 40 according to Embodiment 5 does not include the identification information storage section 407 of Embodiment 3, and the electrical instrument identification information is stored in the storage section 408. Note that, in a case of reading and writing information from and to the storage section 408 by using the near field communication from the information terminal 10, a configuration is adopted so that the readout and the write can be performed even if power is not supplied from the control section 406 of the electrical instrument 40.

Then, the information terminal 10 according to the present embodiment writes the aspect of the main function into the storage section 408 by using the communication section 101. Then, the control section 406 is configured so as to access the storage section 408 periodically (once a second, and the like), so as to read out the aspect of the main function in the case where the aspect of the main function is written therein, and so as to control the main function section 401 based on this aspect of the main function. Note that, when the main function section control unit 406*a* starts to control the electrical instrument 40, the control section 406 deletes the read-out aspect of the main function in the storage section 408 from the inside of the storage section 408.

As described above, while the information terminal 10 and the electrical instrument 40 perform real-time communication with each other in Embodiment 3, in the present embodiment, the information terminal 10 writes the aspect of the main function into the storage section 408, the electrical instrument 40 reads out the aspect of the main function at predetermined timing, and controls the heating section 401. Hence, for example, no matter whether or not the electrical instrument 40 may be turned on, the information terminal 10 writes the aspect of the main function into the storage section 408, thereafter, the electrical instrument 40 is turned on, whereby the main function section control unit 406*a* can control the heating section 401 of the electrical instrument 40 based on the aspect of the main function, which is written into the storage section 408.

Embodiment 6

Embodiment 6 of the present invention is an example of form in which the electrical instrument of Embodiment 2 is a washing and drying machine. A description is made below of a configuration and operations of Embodiment 6 while mainly focusing different points thereof from those of Embodiment 3.

Figure 18:
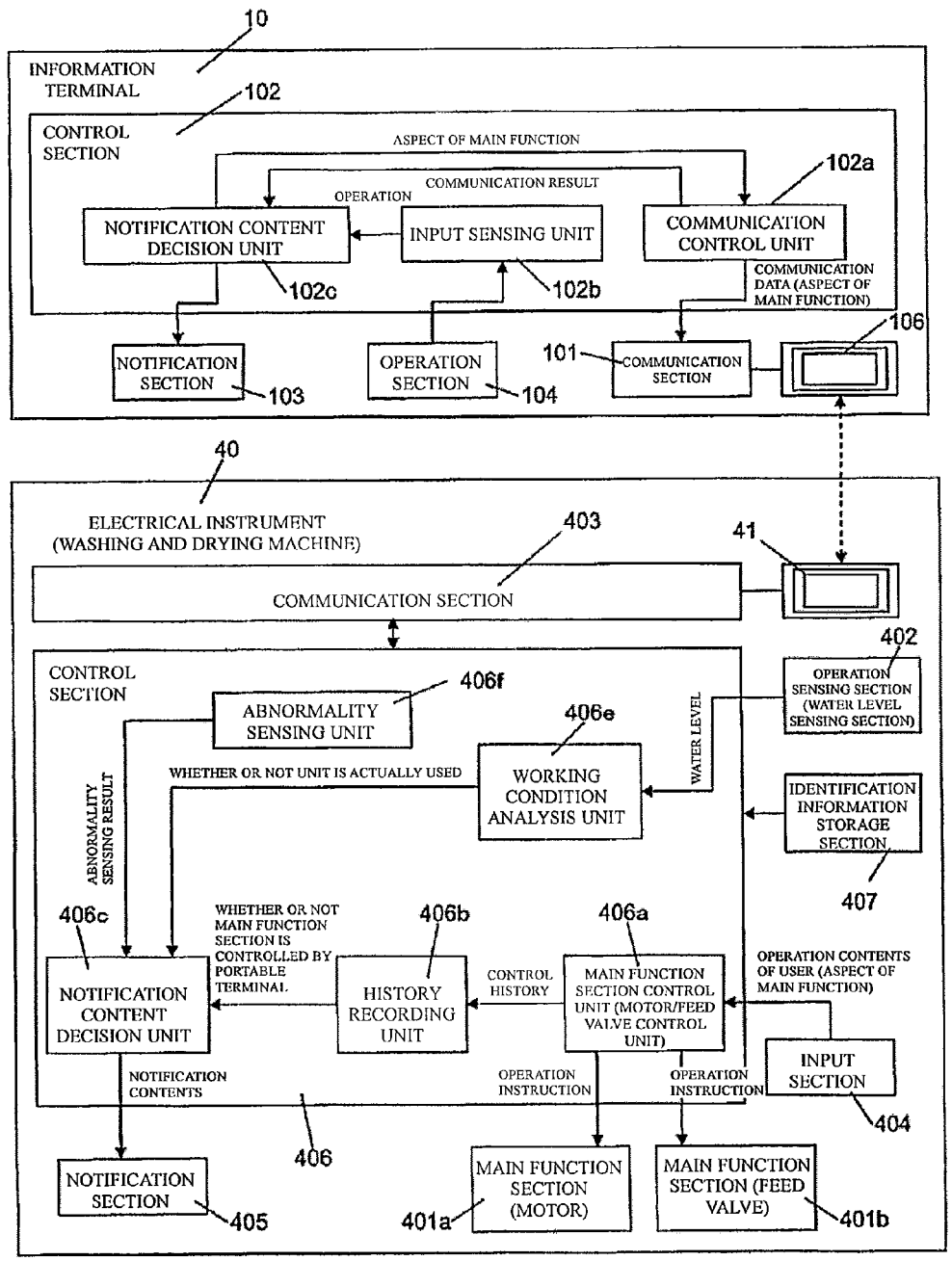
FIG. 18 is a function block diagram showing a configuration example of a system in which an electrical instrument in Embodiment 6 of the present invention is included.

FIG. 18 is a function block diagram showing a configuration example of a system in which an electrical instrument in Embodiment 6 is included.

In the present embodiment, the electrical instrument 40 is a washing and drying machine.

Moreover, the main function section of the electrical instrument 40 includes main function sections 401*a* and 401*b*. The main function section 401*a* includes a motor that rotates a washing machine tub. The main function section 402*b* includes a feed valve that feeds water to the washing machine tub.

Furthermore, the operation sensing section 402 is a water level sensing section (water sensing section), and measures a level of water reserved in the washing machine tub.

In the case where the main function section control unit 406*a* performs control to open the main function section 401*b* as the feed valve, and the operation sensing section 402 senses that water is present in the washing machine tub by a rise of the water level in the washing machine tub, and thereafter, the main function section control unit 406*a* performs control to rotate the main function section 401*a* as the motor, the working condition analysis unit 406*e* determines that the user uses the electrical instrument 40 in his/her life. In this way, use of the electrical instrument 40 in a trial run in a manufacturing line, a demonstration run in a shop front, and the like, in which the electrical instrument 40 is frequently run without allowing an inside of the washing machine tub to be filled with water, and use of the electrical instrument 40 in the user's life can be distinguished from each other. In this way, the near field communication control history received by the communication section 403 in the use of the electrical instrument 40 in the trial run in the manufacturing line, the demonstration run in the shop front, and the like is not stored in the history storage unit, and therefore, the unnecessary notice based on this history can be prevented from being issued to the user who does not give the electrical instrument 40 the aspect of the main function by using the information terminal 10 in the life.

Other configurations of the information terminal 10 and the electrical instrument 40 are similar to those of Embodiment 2, and accordingly, a detailed description thereof is omitted.

Moreover, an operation example of the system in which the electrical instrument 40 is included is similar to those of Embodiments 2 and 3, and accordingly, a detailed description thereof is omitted.

Note that a determination in Step S91 as to whether or not the electrical instrument 40 is used in the user's life in the operation example of the present embodiment is performed based on whether or not the working condition analysis unit 406*e* determines whether or not the rise of the water level is measured by an operation of the feed valve, and the washing machine tub has operated rotationally. Then, in the case where the main function section control unit 406*a* determines that the rise of the water level is measured by an operation of the feed valve, and the washing machine tub has operated rotationally, it is determined that the user has used the electrical instrument 40 in his/her life (Yes in Step S91). Meanwhile, in the case where the main function section control unit 406*a* determines that the rise of the water level is measured by an operation of the feed valve, and the washing machine tub has not operated rotationally, it is determined that the user has not used the electrical instrument 40 in his/her life (No in Step S91).

Embodiment 7

Embodiment 7 of the present invention is an example of a form in which the electrical instrument of Embodiment 2 is a rice cooker. A description is made below of a configuration and operations of Embodiment 7 while mainly focusing different points thereof from those of Embodiment 3.

Figure 19:
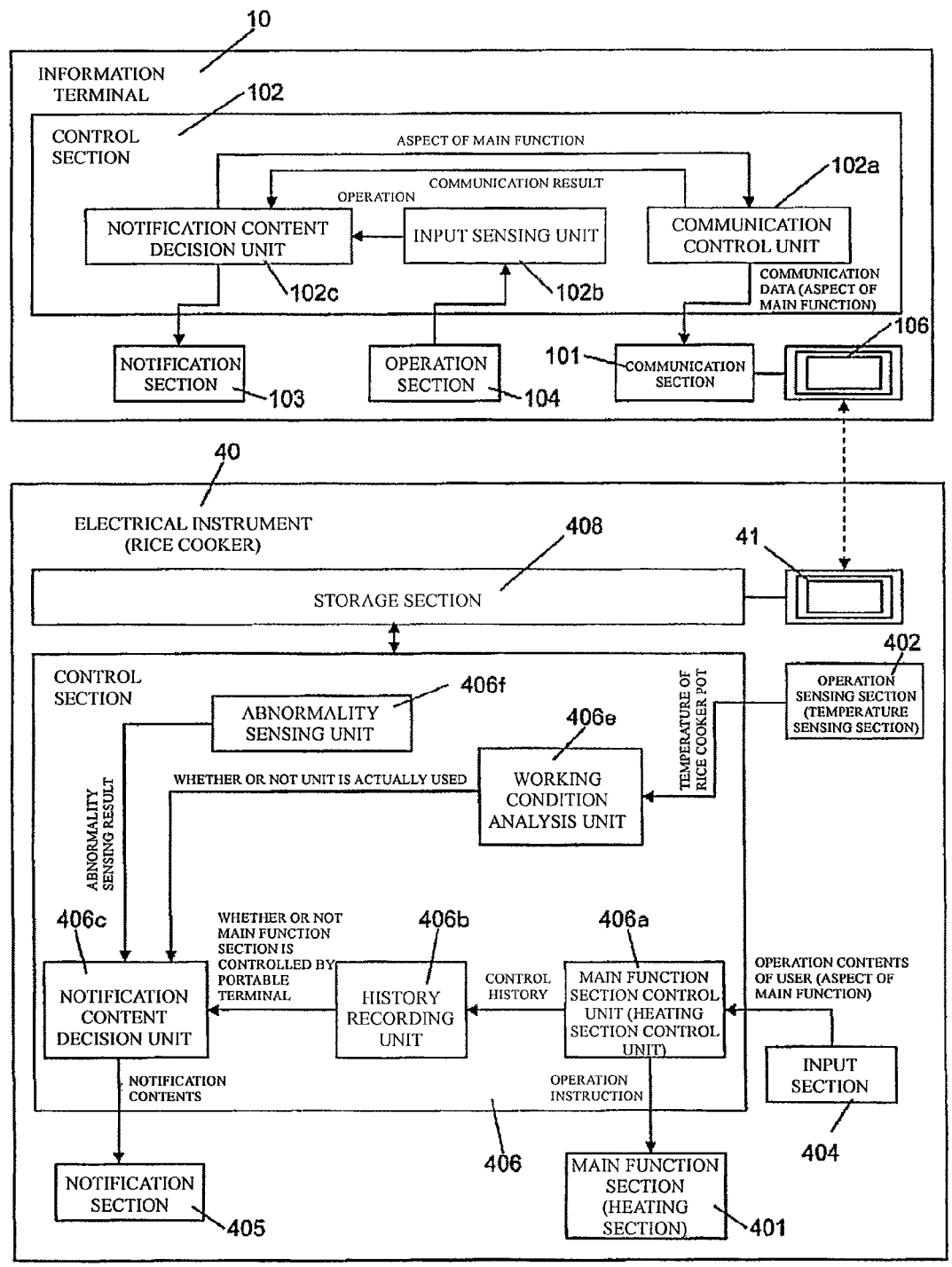
FIG. 19 is a function block diagram showing a configuration example of a system in which an electrical instrument in Embodiment 7 of the present invention is included.

FIG. 19 is a function block diagram showing a configuration example of a system in which an electrical instrument in Embodiment 7 is included.

In the present embodiment, the electrical instrument 40 is a rice cooker.

Moreover, the main function section 401 of the electrical instrument 40 includes: a rice cooker pot; and a heating section that heats the rice cooker pot.

Furthermore, the operation sensing section 402 is a temperature sensing section, and senses a temperature of the rice cooker pot.

In the case where the main function section control unit 406*a* performs control to operate the main function section 401 as the heating section, and the operation sensing section 402 senses a temperature rise of a preset temperature range or less at a preset time interval, the working condition analysis unit 406*e* determines that the user uses the electrical instrument 40 in his/her life. Meanwhile, in the case where the operation sensing section 402 senses a temperature rise larger than a preset value at the preset time interval, the working condition analysis unit 406*e* determines that the user does not use the electrical instrument 40 in his/her life.

That is to say, an operation of the rice cooker in a state where rice and water are not put in the rice cooker pot thereof leads to a steep temperature rise in the rice cooker pot. Meanwhile, in comparison with this, an operation of the rice cooker in a state where rice and water are put in the rice cooker pot thereof leads to a gentle temperature rise. Hence, use of the electrical instrument 40 in a trial run in a manufacturing line, a demonstration run in a shop front, and the like, in which the electrical instrument 40 is frequently run in the state where rice and water are not put in the rice cooker pot of the rice cooker, and use of the electrical instrument 40 in the user's life can be distinguished from each other. Hence, the near field communication control history received by the communication section 403 in the use of the electrical instrument 40 in the trial run in the manufacturing line, the demonstration run in the shop front, and the like is not stored in the history storage unit, and therefore, the unnecessary notice based on this history can be more accurately prevented from being issued to the user who does not give the electrical instrument 40 the aspect of the main function by using the information terminal 10 in the life.

Note that values of the above-described time interval and temperature range are values obtained by experiments and set in advance.

Moreover, in the above-described embodiment, the working condition analysis unit 406e determines whether or not the temperature rise of the preset temperature range or less is sensed at the preset time interval; however, the working condition analysis unit 406e is not limited to this. In place of this, based on whether or not a time required from when the main function section control unit 406a starts to control the main function section 401 until the temperature of the rice cooker pot exceeds 100° C. is a preset time or more, it may be determined whether or not the user uses the electrical instrument 40 in his/her life. That is to say, in the case where the user uses the rice cooker by putting rice and water into the rice cooker pot of the rice cooker, a point of time when the temperature of the rice cooker pot exceeds 100° C. is immediately before completion of rice cooking when water reserved in the rice cooker pot runs out, and for example, is after an elapse of a few ten minutes from start of the rice cooking. Meanwhile, in the case where the user does not use the rice cooker by putting rice and water into the rice cooker pot of the rice cooker, the temperature of the rice cooker pot exceeds 100° C. in a shorter time than the above-described time. Hence, in the case where the time required from when the main function section control unit 406a starts to control the main function section 401 until the temperature of the rice cooker pot exceeds 100° C. is longer than the preset time, it is determined that the user uses the electrical instrument 40 in his/her life. Meanwhile, the time required from when the main function section control unit 406a starts to control the main function section 401 until the temperature of the rice cooker pot exceeds 100° C. is shorter than the preset time, it is determined that the user does not use the electrical instrument 40 in his/her life.

Other configurations of the information terminal 10 and the electrical instrument 40 are similar to those of Embodiment 2, and accordingly, a detailed description thereof is omitted.

Moreover, an operation example of the system in which the electrical instrument 40 is included is similar to those of Embodiments 2 and 3, and accordingly, a detailed description thereof is omitted.

Note that the determination in Step S91 as to whether or not the electrical instrument 40 is used in the user's life in the operation example of the present embodiment is performed based on whether or not the working condition analysis unit 406e determines that the main function section control unit 406a performs control to operate the main function section 401 as the heating section, and that the operation sensing section 402 senses the temperature rise of the preset temperature range or less at the preset time interval. Then, in the case where the main function section control unit 406a determines that the above-described conditions are satisfied, it is determined that the user has used the electrical instrument 40 in his/her life (Yes in Step S91).

Meanwhile, in the case where the main function section control unit 406a determines that the above-described conditions are not satisfied, it is determined that the user has not used the electrical instrument 40 in his/her life (No in Step S91).

Embodiment 8

Embodiment 6 of the present invention is an example of a form in which the electrical instrument of Embodiment 2 is a refrigerator. A description is made below of a configuration and operations of Embodiment 8 while mainly focusing different points thereof from those of Embodiment 3.

Figure 20:
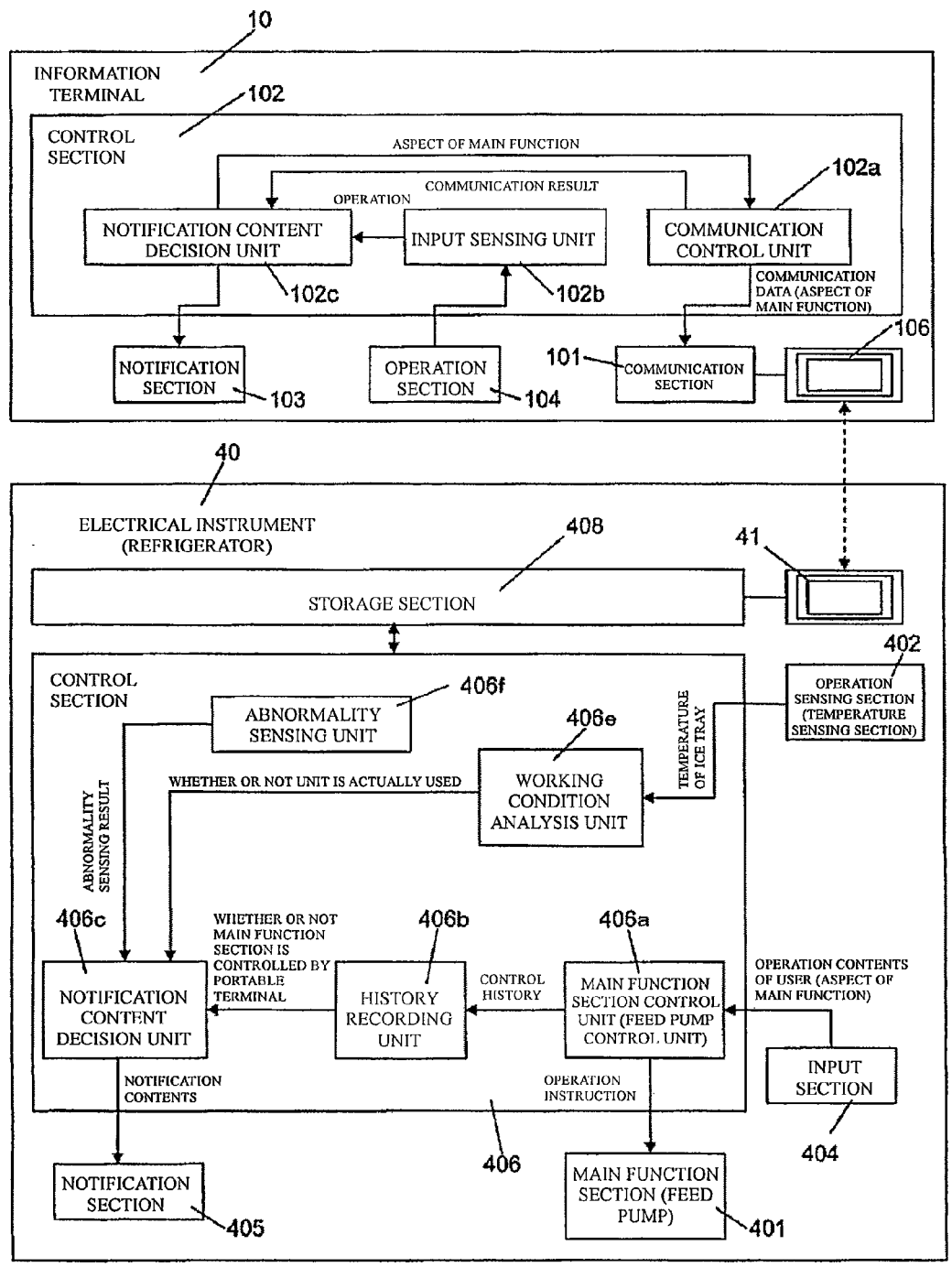
FIG. 20 is a function block diagram showing a configuration example of a system in which an electrical instrument in Embodiment 8 of the present invention is included.
Figure 21:
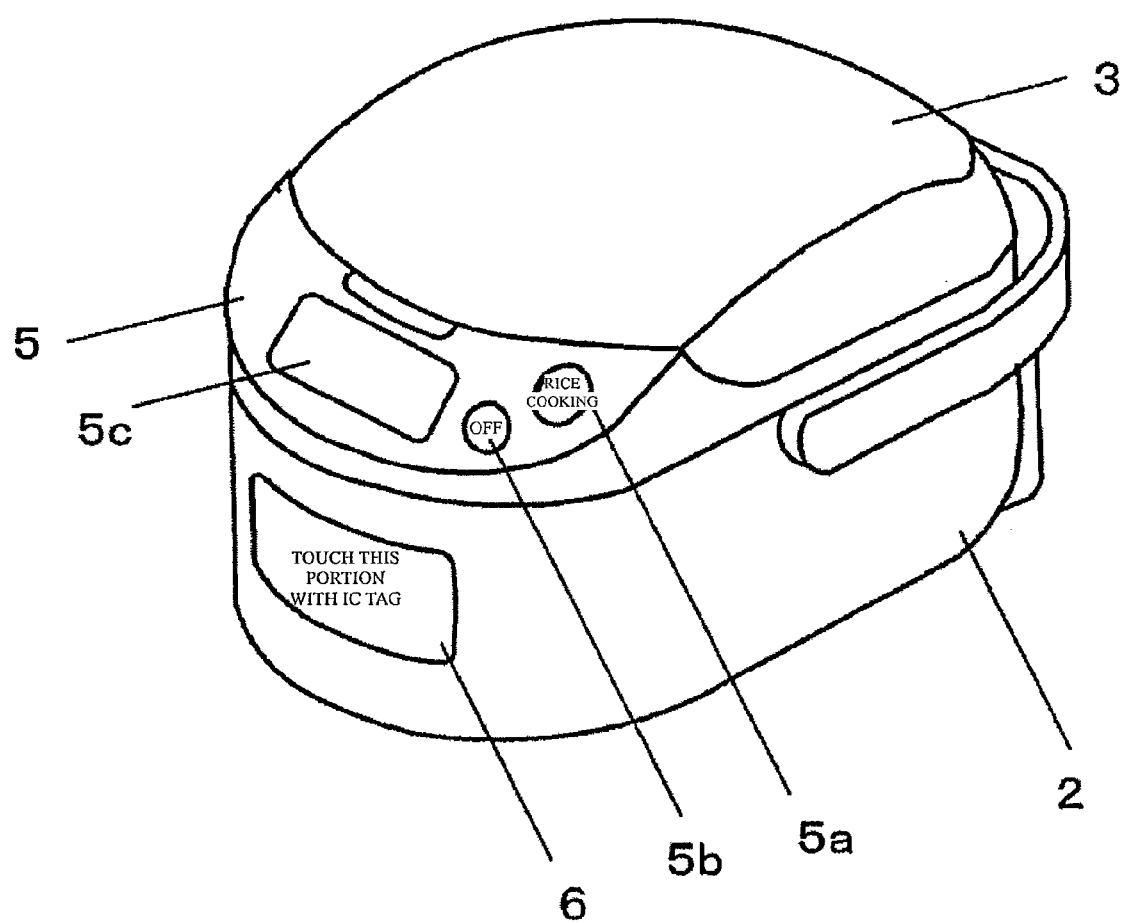
FIG. 21 is a perspective view showing a conventional electrical instrument.

FIG. 20 is a function block diagram showing a configuration example of a system in which an electrical instrument in Embodiment 8 is included.

In the present embodiment, the electrical instrument 40 is a refrigerator equipped with an automatic ice machine.

Moreover, the main function section 401 of the electrical instrument 40 is the automatic ice machine, and includes: a feed tank; and a feed pump that feeds an ice tray with water in the feed tank.

Furthermore, the operation sensing section 402 is a temperature sensing section, and senses a temperature of the ice tray in the present embodiment. Note that the operation sensing section 402 is not limited to this, and may sense a temperature of the ice house.

In the case where the main function section control unit 406a performs control to operate the main function section 401 as the feed pump, and the operation sensing section 402 thereafter senses a temperature rise of the ice tray, and further, thereafter senses that the temperature of the ice tray falls down to a predetermined temperature, which is set in advance, or less, then the working condition analysis unit 406e determines that the user uses the electrical instrument 40 in his/her life. This predetermined temperature is a temperature at which it is determined that water in the ice tray is completely frozen, and for example, is −18° C. Meanwhile, in the case where the operation sensing section 402 does not sense the temperature rise of the ice tray even after the main function section control unit 406a performs the control to operate the main function section 401 as the feed pump, then the working condition analysis unit 406e determines that the user does not use the electrical instrument 40 in his/her life. Moreover, even in the case where the operation sensing section 402 senses the temperature rise of the ice tray after the main function section control unit 406a performs the control to operate the main function section 401 as the feed pump, if the operation sensing section 402 does not sense that the temperature of the ice tray falls down to the predetermined temperature, which is set in advance, or less, then the working condition analysis unit 406e also determines that the user does not use the electrical instrument 40 in his/her life.

Hence, use of the electrical instrument 40 as the automatic ice machine in a trial run in a manufacturing line, a demonstration run in a shop front, and the like, in which the automatic ice machine is less frequently run until water in the ice tray is completely frozen, and use of the electrical instrument 40 in the user's life, in which the automatic ice machine is run until water in the ice tray is completely frozen, can be distinguished from each other. Hence, the near field communication control history received by the communication section 403 in the use of the electrical instrument 40 in the trial run in the manufacturing line, the demonstration run in the shop front, and the like is not stored in the history storage unit, and therefore, the unnecessary notice based on this history can be prevented from being issued to the user who does not give the electrical instrument 40 the aspect of the main function by using the information terminal 10 in the life.

Other configurations of the information terminal 10 and the electrical instrument 40 are similar to those of Embodiment 2, and accordingly, a detailed description thereof is omitted.

Moreover, an operation example of the system in which the electrical instrument 40 is included is similar to those of Embodiments 2 and 3, and accordingly, a detailed description thereof is omitted.

Note that the determination in Step S91 as to whether or not the electrical instrument 40 is used in the user's life in the operation example of the present embodiment is performed based on whether or not the working condition analysis unit 406e determines whether or not, after the main function section control unit 406a performs control to operate the main function section 401 as the feed pump, the operation sensing section 402 senses the temperature rise of the ice tray, and further, thereafter senses that the temperature of the ice tray falls down to the predetermined temperature, which is set in advance, or less. Then, in the case where the main function section control unit 406a determines that the above-described conditions are satisfied, it is determined that the user has used the electrical instrument 40 in his/her life (Yes in Step S91). Meanwhile, in the case where the main function section control unit 406a determines that the above-described conditions are not satisfied, it is determined that the user has not used the electrical instrument 40 in his/her life (No in Step S91).

Other Embodiments

In Embodiment 4 described above, a case where the electrical instrument 40 is the microwave oven is exemplified; however, the electrical instrument 40 is not limited to this, and may be an electrical instrument other than the microwave oven. That is to say, in the case where the electrical instrument other than the microwave oven has controlled the main function section 401 based on the aspect of the main function, which is transmitted from the information terminal 10, further in the case where the near field communication control frequency between the information terminal 10 and the electrical instrument 40 is lower than the predetermined value, it may be decided so that the user notification information can include the prompting of the implementation of the communication between the information terminal 10 and the electrical instrument 40, and the notification section 405 may notify the user of this user notification information.

From the above description, many improvements and other embodiments are apparent for those skilled in the art. Hence, the above description should be interpreted only as exemplification, and is offered for the purpose of teaching the best mode for carrying out the present invention to those skilled in the art. Details of the structure and/or function of the present invention can be substantially changed without departing from the spirit thereof.

INDUSTRIAL APPLICABILITY

The electrical instrument according to the present invention is useful for the system that performs setting of the operations of the electrical instrument.

What is claimed is:
1. An electrical instrument comprising:
a main function section that is controlled by a main function section control unit and executes a main function that is a function as a main object of the electrical instrument;
a communication section that receives an aspect of the main function to be executed by the main function section from an external information terminal by near field communication, the communication section being provided separately from the main function section, the aspect being an aspect in which the electrical instrument exerts a function as a main object of the electrical instrument;
an input section for allowing a user to input an aspect of the main function to be executed by the main function section;
a notification section for issuing a notice on information regarding the near field communication, the information containing abnormality of the communication section; and
a control unit provided separately from the main function section and the communication section, wherein
the control unit includes:
the main function section control unit that controls the main function section based on the aspect of the main function, which is inputted to the input section, and based on the aspect of the main function, which is received by the communication section;
an abnormality sensing unit that senses the abnormality of the communication section;
a history recording unit that records a near field communication control history that is a history that the main function section control unit has controlled the main function section based on the aspect of the main function, which is received by the communication section; and
a notification content decision unit that decides to issue a notice on the abnormality of the communication unit in the case where the abnormality sensing unit senses the abnormality and the near field communication control history is recorded in the history recording unit and that decides not to issue the notice on the abnormality of the communication unit in the case where the abnormality sensing unit senses the abnormality and the near field communication control history is not recorded in the history recording unit.
2. The electrical instrument according to claim 1, wherein the history recording unit is further configured to record an input control history that is a history that the main function section control unit has controlled the main function section based on the aspect of the main function, which is inputted to the input section,
the electrical instrument further comprises;
a history analysis unit that, based on the near field communication control history and the input control history, which are recorded in the history recording unit, analyzes a relative frequency (hereinafter, referred to as a near field communication control relative frequency) of a fact that the main function section control unit has controlled the main function section based on the aspect of the main function, which is received by the communication section, to a fact that the main function section control unit has controlled the main function section based on the aspect of the main function, which is inputted to the input section, and the notification content decision unit is configured to decide to issue a notice on information that prompts implementation of the communication between the electrical instrument and the information terminal as the information regarding the near field communication in the case where the near field communication control history is recorded in the history recording unit and the near field communication control relative frequency is lower than a predetermined value.

3. The electrical instrument according to claim 1, wherein the electrical instrument is a home electrical instrument, the electrical instrument further comprises:

an operation sensing section that senses an operation result of the main function section; and a working condition analysis unit that determines whether or not the home electrical instrument is used in a user's life based on the operation result sensed by the operation sensing section, and the history recording unit starts to record the near field communication control history in the case where the working condition analysis unit determines that the home electrical instrument is used in the user's life.

4. The electrical instrument according to claim 3, wherein the electrical instrument is a home heating cooking device, the main function section at least includes a heating chamber and a heating section that heats food housed in the heating chamber, the operation sensing section is a temperature sensing section that senses a temperature of the heating chamber, and the working condition analysis unit determines that the heating cooking device is used in the user's life in the case where the main function section control unit performs control to operate the heating section and the temperature sensing section senses a change of a temperature of the heating chamber.

5. The electrical instrument according to claim 3, wherein the electrical instrument is a home washing and drying machine, the main function section includes a washing machine tub, a motor that rotates the washing machine tub, and a feed valve that feeds the washing machine tube with water by open and close of the feed valve, the operation sensing section is a water sensing section that senses whether or not water is present in the washing machine tub, and the working condition analysis unit determines that the home washing and drying machine is used in the user's life in the case where the main operation control unit performs control to rotate the motor after the main operation control unit performs control to open the feed valve and the water sensing section senses that water is present in the washing machine tub.

6. The electrical instrument according to claim 1, wherein the electrical instrument is a microwave oven, a rice cooker, a television set, an air conditioner, a washing machine, or a refrigerator.

* * * * *